(12) United States Patent
Ouchi et al.

(10) Patent No.: US 7,085,027 B2
(45) Date of Patent: Aug. 1, 2006

(54) IMAGE COMBINER AND IMAGE DISPLAY

(75) Inventors: Yumiko Ouchi, Tokyo (JP); Kenji Hori, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/257,437

(22) Filed: Oct. 24, 2005

(65) Prior Publication Data

US 2006/0039046 A1 Feb. 23, 2006

Related U.S. Application Data

(63) Continuation of application No. PCT/JP2004/05985, filed on Apr. 26, 2004.

(30) Foreign Application Priority Data

Apr. 28, 2003 (JP) ............................. 2003-123271

(51) Int. Cl.
*G02B 5/32* (2006.01)

(52) U.S. Cl. ........................... 359/16; 359/13; 359/14; 359/15; 359/630; 345/9

(58) Field of Classification Search ............ 359/13–16, 359/630; 345/7–9
See application file for complete search history.

(56) References Cited

U.S. PATENT DOCUMENTS

| | | |
|---|---|---|
| 4,655,540 A | 4/1987 | Wood et al. |
| 5,089,903 A | 2/1992 | Kuwayama et al. |
| 5,144,459 A | 9/1992 | Felske et al. |
| 5,363,220 A | 11/1994 | Kuwayama et al. |
| 5,680,231 A | 10/1997 | Grinberg et al. |
| 6,429,954 B1 * | 8/2002 | Kasai ........................ 359/13 |
| 6,816,132 B1 | 11/2004 | Tanijiri et al. |
| 6,822,770 B1 | 11/2004 | Takeyama |
| 2001/0033401 A1 * | 10/2001 | Kasai et al. .................. 359/15 |
| 2002/0135830 A1 * | 9/2002 | Endo et al. ................... 359/15 |
| 2003/0086135 A1 | 5/2003 | Takeyama |
| 2004/0233488 A1 * | 11/2004 | Kasai et al. .................. 359/15 |
| 2005/0141066 A1 | 6/2005 | Ouchi |

(Continued)

FOREIGN PATENT DOCUMENTS

EP 0 200 022 A 11/1986

(Continued)

*Primary Examiner*—Leonidas Boutsikaris
(74) *Attorney, Agent, or Firm*—Frishauf, Holtz, Goodman & Chick, P.C.

(57) ABSTRACT

The light from the image forming element 2 is reflected by the PBS 8, and is incident on the λ/4 plate 7 so that this light is converted into circularly polarized light. Subsequently, the light is subjected to a reflection/diffraction effect and image focusing effect by the reflective type HOE 6. Then, this light again passes through the λ/4 plate 7, and is transmitted through the PBS 8. As a result, the light enters the eye of the user after being synthesized with light from the outside world. The system is devised so that the relationships of −5<θ1<5 and |θ1−θ2|<3 are established between the angle of incidence θ1 (°) at which the principal rays emitted from the center of the display part of the image forming means are incident on the reflective type holographic optical element, and the reflection/diffraction angle θ2 (°) when this light is diffracted/reflected by the reflective type holographic optical element. This makes it possible to achieve the improvement of the image quality of the display image in cases where the center of the pupil of the eye of the user deviates from the center of the exit pupil of the image combiner.

24 Claims, 23 Drawing Sheets

U.S. PATENT DOCUMENTS

2005/0248818 A1 11/2005 Ouchi et al.

FOREIGN PATENT DOCUMENTS

| | | |
|---|---|---|
| EP | 0 216 692 A2 | 4/1987 |
| JP | 02-063379 A | 3/1990 |
| JP | 04-341078 A | 11/1992 |
| JP | 06-250101 A | 9/1994 |
| JP | 06-324284 A | 11/1994 |
| JP | 9-504120 A | 4/1995 |
| JP | 07-234376 A | 9/1995 |
| JP | 07-239447 A | 9/1995 |
| JP | 07-244253 A | 9/1995 |
| JP | 07-284041 A | 10/1995 |
| JP | 08-021974 A | 1/1996 |
| JP | 08-166557 A | 6/1996 |
| JP | 08-168059 A | 6/1996 |
| JP | 08-304734 A | 11/1996 |
| JP | 08-313844 A | 11/1996 |
| JP | 08-320453 A | 12/1996 |
| JP | 09-018756 A | 1/1997 |
| JP | 09-159965 A | 6/1997 |
| JP | 09-318905 A | 12/1997 |
| JP | 10-074051 A | 3/1998 |
| JP | 10-327373 A | 12/1998 |
| JP | 11-064781 A | 3/1999 |
| JP | 11-133348 A | 5/1999 |
| JP | 11-136598 A | 5/1999 |
| JP | 11-174991 A | 7/1999 |
| JP | 2000-111828 A | 4/2000 |
| JP | 2000-121989 A | 4/2000 |
| JP | 2000-249967 A | 9/2000 |
| JP | 2000-249972 A | 9/2000 |
| JP | 2000-249974 A | 9/2000 |
| JP | 2000-330070 A | 11/2000 |
| JP | 2000-352689 A | 12/2000 |
| JP | 2001-075496 A | 3/2001 |
| JP | 2001-264682 A | 9/2001 |
| JP | 2002-162597 A | 6/2002 |
| JP | 2002-258488 A | 9/2002 |
| JP | 2002-311379 A | 10/2002 |
| JP | 2003-140079 A | 5/2003 |
| JP | 2003-140081 A | 5/2003 |
| JP | 2004-061731 A | 2/2004 |
| JP | 2004-078057 A | 3/2004 |
| JP | 2004-080679 A | 3/2004 |
| JP | 2004-086190 A | 3/2004 |
| JP | 2004-240037 A | 8/2004 |
| WO | 95/11473 A | 4/1995 |
| WO | 96/00406 A1 | 1/1996 |
| WO | 97/31477 A | 8/1997 |
| WO | 97/34182 A | 9/1997 |
| WO | 00/10156 A | 2/2000 |

* cited by examiner

During manufacture of hologram
(a)

During use of hologram
(b)

(a)

(b)

(a)

(b)

(a)

(b)

(a)

(b)

IMAGE COMBINER AND IMAGE DISPLAY

This is a continuation-in-part from PCT International Application No. PCT/JP2004/005985 filed on Apr. 26, 2004, which is hereby incorporated by reference.

TECHNICAL FIELD

The present invention relates to an image combiner which makes it possible for the user to view an image based on light from the front such as the outside world and a display image that is superimposed on this first image and which uses a reflective type holographic optical element (hologram optical element), and an image display device which uses a reflective type holographic optical element.

BACKGROUND ART

In the past, the image display devices disclosed in Japanese Patent Application Kokai No. 2000-352689 and Japanese Patent Application Kokai No. 2001-264682, for example, have been known as so-called see-through type head mounted image display devices (head mounted displays) which allow the user to view a display image superimposed on a view of the outside world while observing the conditions of this outside world.

Furthermore, Japanese Patent Application Kokai No. 2001-264682 discloses not only a see-through type head mounted image display device, but also an image display device that is not used as a see-through type device (i.e., that conducts only light from an image forming element to the eye of the user without superimposing other light from the outside world or the like on this light from the image forming element) while having substantially the same construction as such a see-through type device; an example in which this image display device is contained in the flipper part of a portable telephone is also disclosed.

In these image display devices, a reduction in size and weight is achieved by using a reflective type holographic optical element. Such a reflective type holographic optical element is superior in terms of wavelength selectivity, and can selectively diffract/reflect only light in an extremely limited wavelength region. Accordingly, in cases where a see-through type image display device is constructed, the amount of light that is lost when light from the outside world or the like passes through the image combiner can be noticeably reduced by using a reflective type holographic optical element.

Furthermore, in these image display devices, since a reflective type hologram is used as the image combiner, the reflective type hologram is disposed so that this hologram is embedded in respect to the optical path in order to separate light from the outside world and from the display light. Moreover, in these image display devices, a liquid crystal display element is generally used as the image forming element in order to achieve a reduction in size and weight, and an LED, which is a compact and inexpensive light source, is used as the light source that illuminates this image forming element.

However, in these conventional image display devices, although a good display image can be viewed in cases where the center of the pupil of the eye of the user and the center of the exit pupil of the image combiner coincide, the display screen gradually becomes darker as the center of the pupil of the eye of the user moves toward the periphery of the exit pupil of the image combiner from the center of this exit pupil, and the display image appears to be blurred, so that the image is not always adequate in terms of quality. Furthermore, during actual use, it can frequently happen that the center of the pupil of the eye of the user deviates from the center of the exit pupil of the image combiner.

DISCLOSURE OF THE INVENTION

The present invention was devised in light of such circumstances; it is an object of the present invention to provide an image display device which can improve the image quality of the display image in cases where the center of the pupil of the eye of the user deviates from the center of the exit pupil of the image combiner, while achieving a reduction in size and weight by using a reflective type holographic optical element, and an image combiner that can be used in such an image display device or the like. Furthermore, in the following description, there may be instances in which the holographic optical element is referred to as an "HOE."

The first invention that is used to achieve the object described above is an image combiner in which a reflective type holographic optical element is installed, and light from an image forming means and light passing through the main body are superimposed, wherein the light that is emitted from the image forming means has only a single wavelength region component or a plurality of discrete wavelength region components, and the following conditions are established between the angle of incidence at which the principal rays emitted from the center of the display part of the image forming means are incident on the surface of the reflective type holographic optical element and the angle of reflection/diffraction:

$-5<\theta1<5$, and $|\theta1-\theta2|<3$, where $\theta1$ is the angle of incidence (°) at which the principal rays emitted from the center of the display part of the image forming means are incident on the reflective type holographic optical element, and $\theta2$ is the reflection/diffraction angle (°) when the principal rays emitted from the center of the display part are diffracted/reflected by the reflective type holographic optical element.

The second invention that is used to achieve the object described above is the first invention, wherein $-3<\theta1<3$.

The third invention that is used to achieve the object described above is the first invention or second invention, wherein $|\theta1-\theta2|<2$.

The fourth invention that is used to achieve the object described above is any of the first through third inventions, wherein the reflective type holographic optical element is a volume type element.

The fifth invention that is used to achieve the object described above is any of the first through fourth inventions, wherein the reflective type holographic optical element has an optical power.

The sixth invention that is used to achieve the object described above is any of the first through fifth inventions, wherein the direction of emission of the principal rays from the image forming means is a direction that is substantially perpendicular to the surface of the display part of the image forming means.

The seventh invention that is used to achieve the object described above is an image display device comprising the image combiner and image forming means of any of the first through sixth inventions, wherein at least the part containing the image combiner is used in close proximity to the eye of the user during use.

The eighth invention that is used to achieve the object described above is an image display device in which a reflective type holographic optical element is installed, and light from an image forming means is displayed, wherein the light that is emitted from the image forming means has only a single wavelength region component or a plurality of discrete wavelength region components, and the following conditions are established between the angle of incidence at which the principal rays emitted from the center of the display part of the image forming means are incident on the surface of the reflective type holographic optical element and the angle of reflection/diffraction:

$-3 < \theta1 < 3$, and $|\theta1-\theta2| < 5$, where $\theta1$ is the angle of incidence (°) at which the principal rays emitted from the center of the display part of the image forming means are incident on the reflective type holographic optical element, and $\theta2$ is the reflection/diffraction angle (°) when the principal rays emitted from the center of the display part are diffracted/reflected by the reflective type holographic optical element.

The ninth invention that is used to achieve the object described above is the eighth invention, wherein $|\theta1-\theta2| < 3$.

The tenth invention that is used to achieve the object described above is the eighth invention or ninth invention, wherein $|\theta131\ \theta2| < 2$.

The eleventh invention that is used to achieve the object described above is any of the eighth through tenth inventions, wherein the reflective type holographic optical element is a volume type element.

The twelfth invention that is used to achieve the object described above is any of the eighth through eleventh inventions, wherein the reflective type holographic optical element has an optical power.

The thirteenth invention that is used to achieve the object described above is any of the eighth through twelfth inventions, wherein the direction of emission of the principal rays from the image forming means is a direction that is substantially perpendicular to the surface of the display part of the image forming means.

It is known that the diffraction characteristics of a reflective type HOE, and especially of a reflective volume type HOE, have a sharp wavelength selectivity and broad angular characteristics. Specifically, diffracted light can be obtained at a maximum efficiency with respect to reproduced light incident at an angle and a wavelength that satisfy the Bragg condition; however, there are characteristics in which the diffraction efficiency drops abruptly when there is a departure from the Bragg condition with respect to the incident wavelength, and on the other hand, there are characteristics in which the diffraction efficiency gradually decreases in cases where the angle of incidence departs from Bragg angle incidence. As a result of these characteristics, such a reflective volume type HOE has become known as an element suitable for use in an image combiner that is capable of performing an image display having a wide angle of view without losing the brightness of light from the outside world. However, this is an argument that is limited solely by the value of the diffraction efficiency in the case of illumination by light of a single wavelength; consideration has not been given to the wavelength characteristics of light that is diffracted in cases where illumination is actually performed using illuminating light that has a bandwidth.

The present inventor investigated the diffraction characteristics in a case where the angle of incidence deviates from Bragg angle incidence, and discovered that the wavelength that is diffracted at a maximum efficiency varies in accordance with the deviation from the Bragg angle incidence. Similarly, furthermore, the inventor also discovered that when the diffracted light from an HOE is observed from different directions, the wavelength at which the diffraction efficiency shows the highest value varies. This point will be described below.

Diffraction by a hologram shows a maximum diffraction intensity in a direction that conforms to the Bragg conditional formula. The Bragg conditional formula in a volume type hologram is expressed by the following equations. The intensity of the light that is diffracted in a direction that simultaneously satisfies Equation (1) and Equation (2) shows a maximum value.

$$1/\lambda_R (\sin \theta_O - \sin \theta_R) = 1/\lambda_C (\sin \theta_I - \sin \theta_C) \quad (1)$$

$$1/\lambda_R (\cos \theta_O - \cos \theta_R) = 1/\lambda_C (\cos \theta_I - \cos \theta_C) \quad (2)$$

Here, the left side in Equations (1) and (2) indicates the state during the recording of the hologram, $\lambda_R$ indicates the recording wavelength, $\theta_O$ indicates the angle of incidence of the object light with respect to the normal of the plane of the hologram, and $\theta_R$ indicates the angle of incidence of the reference light. Furthermore, the right side in Equations (1) and (2) indicates the state during end-use of the hologram, $\lambda_C$ indicates the end-use wavelength, $\theta_C$ indicates the angle of incidence of the illuminating light with respect to the normal of the plane of the hologram, and $\theta_I$ indicates the angle of emission of the diffracted light.

If this is shown graphically in a simplified manner, FIG. 3 is obtained. Furthermore, in FIG. 3 (b), $P_C$ indicates the position of the center of the pupil of the eye of the user. When ray tracing is performed, the light rays are traced from the position $P_C$; accordingly, the orientation of the light rays in FIG. 3 (b) is shown as coinciding with the case of ray tracing; however, the actual orientation of the light rays is the opposite orientation.

Here, if the wavelength $\lambda_C$ which has a diffraction intensity and the angle of incidence $\theta_I$ of the illuminating light are determined from the conditions during the manufacture of the HOE and the angle $\theta_C$ of the line of sight on the basis of Equation (1) and Equation (2), the following equations are obtained.

$$\lambda_C = -[(\sin \theta_O - \sin \theta_R)\sin \theta_C + (\cos \theta_O - \cos \theta_R)\cos \theta_C] \times 2/[(\sin \theta_O - \sin \theta_R)^2 + (\cos \theta_O - \cos \theta_R)^2] \times \lambda_R \quad (3)$$

$$\theta_I = arc\sin \{\lambda_C/\lambda_R \times (\sin \theta_O - \sin \theta_R) + \sin \theta_C\} \quad (4)$$

Here, the intensity of diffracted light in cases where there is a deviation from the Bragg condition is not zero, but the intensity rather decreases according to the amount of this deviation. The manner in which this intensity decreases varies according to the thickness of the phase volume type hologram material and the amount of variation in the refractive index; this intensity decreases more abruptly as the thickness increases, or as the amount of variation in the refractive index increases. In other words, the wavelength selectivity becomes sharper, so that the contribution of the diffraction indicated by Equation (2) becomes greater.

In actuality, therefore, the wavelength in Equation (3) is the wavelength at which the diffraction intensity shows a maximum value, and not only the light of this wavelength, but light in a wavelength band having a bandwidth in the vicinity of this wavelength is also actually diffracted/reflected. Accordingly, $\lambda_C$ in Equation (3), which satisfies the Bragg condition formula, is called the dominant diffraction wavelength.

Here, the behavior of the dominant diffraction wavelength and the angle of incidence $\theta_I$ of the illuminating light corresponding to the line of sight was investigated by varying the angle $\theta_C$ of the line of sight under the conditions which are such that the exposure wavelength is 476 nm, the angle of incidence of reference light is 30°, the angle of incidence of object light is 150°, and the reflective type HOE is in air.

The respective angles were measured in counterclockwise rotation from the positive direction of the normal of the reflective type HOE. The results obtained are shown in the following table. As is seen from Table 1, the dominant diffraction wavelength $\lambda_C$ shifts by approximately ±9 nm when the angle $\theta_C$ of the line of sight varies by ±5°.

TABLE 1

| Angle $\theta_C$ of line of sight (deg) | Dominant diffraction wavelength $\lambda_C$ (nm) | Angle of incidence $\theta_I$ of illuminating light (deg) |
|---|---|---|
| 25 | 484.5 | 155 |
| 30 | 476 | 150 |
| 35 | 466.4 | 145 |

Here, when Equation (3) is rewritten as the ratio $\lambda_C/\lambda_R$ of the dominant diffraction wavelength $\lambda_C$ to the exposure wavelength $\lambda_R$ (relative dominant diffraction wavelength), the following equation is obtained:

$$\lambda_C/\lambda_R = -[(\sin\theta_O - \sin\theta_R)\sin\theta_C + (\cos\theta_O - \cos\theta_R)\cos\theta_C] \times 2/[(\sin\theta_O - \sin\theta_R)^2 + (\cos\theta_O - \cos\theta_R)^2] \quad (5)$$

FIG. 4 shows a graph of the variation in the value of the relative dominant diffraction wavelength $\lambda_C/\lambda_R$ indicated in Equation (5) when the difference $(\theta_C - \theta_R)$ of the angle $\theta_C$ of the line of sight relative to the angle of incidence $\theta_R$ of the reference light during exposure was varied with the angle of the exposure light as a parameter.

As is seen from FIG. 4, the value of the relative dominant diffraction wavelength $\lambda_C/\lambda_R$ also departs from 1 as the difference in angles $(\theta_C - \theta_R)$ departs from 0. Accordingly, it is seen that the wavelength shift increases as the difference $(\theta_C - \theta_R)$ between the angle $\theta_C$ of the line of sight and the angle of incidence $\theta_R$ of the reference light during exposure increases. Furthermore, for convenience of description, this phenomenon is called the "wavelength shift phenomenon."

In the embodiments described in Japanese Patent Application Kokai No. 2000-352689 and Japanese Patent Application Kokai No. 2001-264682 described above, a reflective type holographic optical element is used which is manufactured with the position of the reference light source used for exposure during manufacture caused to coincide with the position of the exit pupil of the image combiner. Specifically, the position of the reference light source during exposure is defined as the pupil position of the end-use system. Accordingly, while the difference between the angle of incidence of the reference light during exposure and the angle of the line of sight is substantially zero at all angles of view for the principal rays during end-use, a difference is generated between the angle $\theta_C$ of the line of sight and the angle of incidence $\theta_R$ of the reference light for light rays (marginal rays) passing through positions that deviate from the center in the exit pupil of the image combiner. Consequently, a wavelength shift occurs in the marginal rays during use as a result of the wavelength shift phenomenon described above.

Furthermore, in the conventional image display devices described above, it has been ascertained that the reason that the display screen becomes darker as the center of the pupil of the eye of the user moves toward the periphery of the exit pupil of the image combiner from the center of this exit pupil is as follows: namely, since the wavelength shift increases when moving toward the periphery of the pupil, the intensity resulting from the combination of the bandwidth of the incident illuminating light and the wavelength characteristics of the diffraction intensity decreases as the periphery of the pupil is approached. Moreover, it has been ascertained that the reason that the image appears to be blurred is as follows: namely, since the diffraction wavelength varies as the periphery of the pupil is approached, a lateral chromatic aberration is generated.

For the image display devices of several embodiments described in Japanese Patent Application Kokai No. 2000-352689 and Japanese Patent Application Kokai No. 2001-264682, the present inventor concretely determined the variation in the diffraction wavelength described above and the resulting amount of lateral chromatic aberration by performing ray tracing toward the image forming element (image forming member such as a liquid crystal display element) from the pupil of the observer (user). The results obtained will be described below.

In the case of Embodiment 3 described in Japanese Patent Application Kokai No. 2000-352689, the Bragg condition is satisfied with respect to the principal rays, i.e., light rays directed toward various points of the image plane from the center of the pupil. Accordingly, light at the same wavelength (532 nm) as the exposure wavelength is reflected/diffracted at a high diffraction efficiency over all angles of view; however, the diffraction efficiency of light rays that are incident from the pupil coordinate y=1.5 mm (the y axis is taken in the upward direction in the plane of the page) shows a maximum value at 527 nm. Conversely, the diffraction efficiency of light rays that are incident from the position of the pupil coordinate y=−1.5 mm shows a maximum value at 537 nm. In other words, it is seen that the diffraction wavelength shifts by ±5 nm as the periphery of the pupil is approached. Here, the pupil coordinates refer to positional coordinates within the plane of the pupil, with the center of the pupil taken as the origin, and the units are set as mm.

In cases where a green LED which has an emission peak in the vicinity of 532 nm is used as the illuminating light source, if the emission characteristics are set at (for example) approximately 10 nm in terms of the full width at half maximum, the emission intensity at a wavelength of 527 nm is 0.5, and the emission intensity at a wavelength of 537 nm is 0.5, where the emission intensity at a wavelength of 532 nm is taken as 1. Accordingly, at positions where the pupil coordinate y=±1.5, even if the diffraction efficiency is a high efficiency of 90% or greater, the intensity of the illuminating light is 0.5 or less compared to the center since the diffraction wavelength is shifted by ±5 nm; as a result, the observed image becomes darker.

Furthermore, if the lateral chromatic aberration is calculated, then, relative to the y coordinate y=0.0 on the image plane of light that is incident at an angle of view of 0° from the center of the pupil at a wavelength of 532 nm, the height on the image plane of light rays that are incident from a pupil coordinate y=1.5 mm at a wavelength of 527 nm is y=−0.10 mm, and the height on the image plane of light rays that are incident from a pupil coordinate y=−1.5 mm at a wavelength of 532 nm is y=0.12 mm, so that a lateral chromatic aberration of 0.1 mm or greater is generated.

Assuming that a ¼ inch (4.8×3.6 mm) QVGA (320×240 pixels) liquid crystal display device is placed on the image plane, i.e., the surface of the image forming member, then the size of one pixel is 0.015 mm square, and the chromatic aberration described above has a large value corresponding to 7 to 8 pixels. Specifically, as a result of the chromatic aberration arising from this wavelength shift, the image appears to be blurred as the periphery of the pupil is approached.

When the present inventor further studied this wavelength shift phenomenon on the basis of results elucidating the causes of the problems encountered in such conventional image display devices, it was found that the slope of the variation in the relative dominant diffraction wavelength with respect to $(\theta_C-\theta_R)$ depended on the angle of incidence $\theta_R$ of reference light during exposure.

Accordingly, assuming that $\theta_R=0$ and $\theta_O=180°$ in Equation (5), then this corresponds to a case in which exposure is performed from the normal direction of both surfaces of the HOE, and in this case, Equation (5) can be rewritten as follows:

$$\lambda_C/\lambda_R=\cos\theta_C \quad (6)$$

In this state, assuming that the reflective type HOE was in air, the angle $\theta_c$ of the line of sight (corresponding to the angle of view) was varied, and the behavior of the relative dominant diffraction wavelength and the illuminating light incidence angle $\theta_1$ corresponding to the line of sight was investigated. The results obtained are shown in Table 2 below.

TABLE 2

| Angle $\theta c$ of line of sight (deg) | Relative dominant diffraction wavelength $\lambda c/\lambda_R$ | Angle of incidence $\theta I$ of illuminating light (deg) |
| --- | --- | --- |
| −5 | 0.996 | 175 |
| 0 | 1 | 180 |
| 5 | 0.996 | 185 |

As is clear from Table 2, the variation in the relative dominant diffraction wavelength is approximately ±0.4% for a variation of ±5° in the angle $\theta_c$ of the line of sight. Specifically, assuming that the exposure wavelength is 476 nm, then the wavelength shift in the dominant diffraction wavelength is ±1.9 nm, which is an extremely small value compared to the example described above. In other words, if an image combiner is constructed using a reflective type HOE which is exposed from the normal direction on both surfaces of the HOE, almost no wavelength shift occurs even if the angle of the line of sight of the user should vary.

Accordingly, even in the peripheral areas of the display screen, or even in cases where the center of the pupil of the eye of the user deviates from the center of the exit pupil of the image combiner, there is little darkening of the display screen or appearance of blurring of the display image, so that the image quality is greatly improved compared to that of the conventional display devices described above. As result, it was discovered that the convenience of use for the user is greatly improved.

Incidentally, in cases where the angle of incidence of light rays on a reflective type HOE and the angle of reflection/diffraction are not specular reflection, the diffraction angle varies greatly even in the case of a very small variation in the wavelength. In other words, it is known that chromatic aberration occurs in the display screen.

In the third, fourth and fifth embodiments disclosed in Japanese Patent Application Kokai No. 2000-352689 described above, the angle of the line of sight with respect to the reflective type HOE is set at 0°; however, the angle of incidence of the illuminating light corresponding to the angle of the line of sight is approximately 18° with respect to the normal of the HOE, so that the apparatus has a construction in which the angle of incidence of the light rays on the HOE and the reflection angle are noticeably different from specular reflection. Accordingly, the chromatic aberration due to the bandwidth of the illuminating light is severe, leading to a decrease in performance.

On the basis of this investigation, the construction of the present invention, which reduces the wavelength shift with respect to the variation in the angle of the line of sight of the user, and reduces chromatic aberration caused by the bandwidth of the illuminating light, is considered in terms of the angle of disposition during end-use.

In cases where it is desired to improve the decrease in the brightness of the display screen that is caused by the wavelength shift that occurs when the angle of the line of sight of the user varies by approximately ±5°, it is desirable that the following conditions be satisfied, where $\theta 1$ (°) is the angle obtained by measuring, from the normal of the hologram plane, the angle of incidence at which the principal rays emitted from the center of the display part of the image display means are incident on the reflective type holographic optical element, and $\theta 2$ (°) is the angle obtained by measuring, from the same normal, the angle of reflection/diffraction (i.e., the angle of the line of sight with respect to these principal rays) that is seen when the principal rays are diffracted/reflected by the reflective type holographic optical element.

$-5<\theta 1<5$, and $|\theta 1-\theta 2|<3$

Furthermore, in cases where the wavelength shift is to be suppressed for an even larger variation in the angle of the line of sight of the user, it is more desirable that the following conditions be satisfied.

$-3<\theta 1<3$, and $|\theta 1-\theta 2|<3$

Moreover, in cases where a liquid crystal display device according to the QVGA standard is used, if the region in which there is substantially no lateral chromatic aberration is within approximately 30% of the central portion when the angle of view in the vertical direction is set at ±6°, it appears that the lateral chromatic aberration remaining at the upper and lower ends is also within a permissible range. In order to satisfy such conditions, it is desirable to set $|\theta 1-\theta 2|$ at 2° or less. In order to improve the image quality even further, it is even more desirable to set $|\theta 1-\theta 2|$ at 1.5° or less.

The above has been a description of the principal rays corresponding to the center of the display part of the image forming element. If the angle of incidence and angle of reflection are made equal not only for these light rays but for all of the light rays that are diffracted/reflected by the reflective type HOE, image information that is absolutely free of lateral chromatic aberration can be conducted to the eye of the user. In such a case, however, while the reflective type HOE acts with respect to wavelength selectivity, this HOE acts only as a planar mirror that has no lens action (i.e., optical power). In such cases, if the system as a whole is considered, it is necessary to correct all of the aberration of the optical system on the side of the image forming element (spherical aberration, astigmatic aberration and the like), so that the optical system of this portion becomes complicated.

Accordingly, in order to simplify the optical system, it is desirable that the reflective type HOE be provided with an optical power. In this case, even if the system is devised so that lateral chromatic aberration does not occur with respect to the principal rays that correspond to the center of the display part of the image forming element, lateral chromatic aberration is generated with respect to the light rays from the peripheral parts of the image forming element. However, as long as the reflective type HOE is not provided with an extremely strong optical power, this can be cancelled by the dispersion of the remaining optical system, so that it is possible to suppress this aberration to a range that causes no practical problems, thus eliminating the problem described above.

Furthermore, as was examined earlier, it is sufficient if the wavelength range requiring correction for lateral chromatic aberration is the range of wavelength selectivity of the reflective type HOE at the maximum limit; accordingly, a certain degree of lateral chromatic aberration correction is sufficient; it is not necessary to sacrifice the lens action of the reflective type HOE in order to achieve complete correction of the lateral chromatic aberration.

Moreover, since the diffraction characteristics of a reflective volume type HOE show a sharp wavelength selectivity (characteristics which are such that only light of a specified wavelength is diffracted in a specified direction when end-use illuminating light is incident at a certain angle of incidence), it is especially desirable to use a volume type element as a reflective type holographic optical element.

In addition, if the system is devised so that the direction of emission of the principal rays from the image forming means is a direction that is substantially perpendicular to the surface of the display part of the image forming means, then the system can be devised so that the relational equation described above holds true for the principal rays from any position on the surface of the image forming means. Accordingly, this is desirable.

Using such an image combiner as an image synthesizing means, images formed on the HOE by light from the image forming means and images from the outside world are synthesized and conducted to the eye of the user. Accordingly, it is especially desirable to construct an image combiner that can be used in close proximity to the eye of the user. For example, cases may be envisioned in which the image combiner is used while mounted on the user as in the case of a head mounted display, or is used in close proximity to the eyes of the user during use as in the case of camera finders, ocular lenses of binoculars, or the like. Thus, the image synthesizing apparatus of the present invention particularly envisions use in a position that is in close proximity to the eyes of the user, i.e., in most cases, a position that is separated from the surface of the eyeball by a distance of 15 mm or less.

In the eighth through thirteenth inventions described above, the reflective type holographic optical element is not always used as an image combiner; these inventions include cases in which such a reflective type holographic optical element is used to form an image simply by diffracting/reflecting light from an image forming element so that a visible image is formed. Such an image display device that is not a see-through device can be contained, for example, in the flipper part of a portable telephone.

The fourteenth invention that is used to achieve the object described above is an image display device which has an image combiner in which images formed by illuminating a reflective type holographic optical element with light from an image forming element are superimposed on light from the outside world so that double images are formed, wherein this image display device has a polarizing beam splitter disposed inside a light transmitting body and a ¼ wavelength plate disposed on the side of the outside world as seen from this polarizing beam splitter, the reflective type holographic optical element is disposed on the outside world side of the ¼ wavelength plate, and is constructed in such a manner that the light from the image forming element is incident on the light transmitting body in a polarized state so that this light is reflected by the polarizing beam splitter, this light is incident on the polarizing beam splitter while being totally reflected by both surfaces of the light transmitting body, the light is reflected by the polarizing beam splitter and passes through the ¼ wavelength plate, the light is then incident on the reflective type holographic optical element at an angle of incidence of $\theta 1$ (°), and is diffracted/reflected at a reflection angle of $\theta 2$ (°), the light again passes through the ¼ wavelength plate, and the light then passes through the polarizing beam splitter, and reaches the eye of the user together with light from the outside world that has passed through the light transmitting body, and there is a relationship of $|\theta 1 - \theta 2| < 3$ between the angle of incidence $\theta 1$ and reflection angle $\theta 2$.

In the present invention, a polarizing beam splitter is used in order to use the relationship $|\theta 1 - \theta 2| < 3$ in a see-through type image display device. As will be described later in the working configurations, the use of a polarizing beam splitter makes it possible to conduct light from the image forming element to the reflective type holographic optical element with good efficiency while causing total reflection of this light inside a thin light transmitting body, so that this light can be conducted to the eyes of the user in a state in which the condition $|\theta 1 - \theta 2| < 3$ is satisfied. Furthermore, from the standpoint of conducting light from the image forming element, it is desirable that the surfaces on both sides of the light transmitting body be parallel. However, if the condition of total reflection is satisfied, it is not absolutely necessary that these surfaces be parallel; a light transmitting body that has an optical power may also be used. This is also true in the case of the fifteenth invention and sixteenth invention described later.

The fifteenth invention that is used to achieve the object described above is an image display device which has an image combiner in which images formed by illuminating a reflective type holographic optical element with light from an image forming element are superimposed on light from the outside world so that double images are formed, wherein this image display device has a polarizing beam splitter disposed inside a light transmitting body and a ¼ wavelength plate disposed on the side of the outside world as seen from this polarizing beam splitter, in a position with an air gap interposed between the ¼ wavelength plate and the light transmitting body, the reflective type holographic optical element is disposed on the outside world side of the ¼ wavelength plate, and is constructed in such a manner that the light from the image forming element is incident on the light transmitting body in a polarized state so that this light is reflected by the polarizing beam splitter, this light is incident on the polarizing beam splitter while being totally reflected by both surfaces of the light transmitting body, the light is reflected by the polarizing beam splitter and passes through the ¼ wavelength plate, the light is then incident on the reflective type holographic optical element at an angle of incidence of $\theta 1$ (°), and is diffracted/reflected at a reflection angle of $\theta 2$ (°), the light again passes through the ¼ wavelength plate, and the light then passes through the polarizing beam splitter, and reaches the eye of the user together with light from the outside world that has passed through the light transmitting body, and there is a relationship of $|\theta 1 - \theta 2| < 3$ between the angle of incidence $\theta 1$ and reflection angle $\theta 2$.

The present invention differs from the fourteenth invention described above in that a ¼ wavelength plate and a reflective type holographic optical element are disposed with an air gap interposed between these parts and the light transmitting body. As will be described later in the working configurations, such an arrangement eliminates the repetition of multiple reflection of the light rays used between the light transmitting body and the reflective type holographic optical element, so that a deterioration in the characteristics of the hologram can be prevented, and the size of the ¼ wavelength plate can be reduced. In addition, in cases where it is desired to provide the parts with an optical power when light from the outside world is received, the optical design of the light path of the light from the image forming element is facilitated if the light transmitting body is formed with parallel planar surfaces, and the system is devised so that a member which is disposed with an air gap interposed between this member and the light transmitting body, and to which the ¼ wavelength plate and reflective type holographic optical element are attached, is provided with an optical power.

The sixteenth invention that is used to achieve the object described above is an image display device which has an image combiner in which images formed by illuminating a reflective type holographic optical element with light from an image forming element are superimposed on light from the outside world so that double images are formed, wherein this image display device has a polarizing beam splitter disposed inside a light transmitting body and a ¼ wavelength plate disposed inside this light transmitting body on the opposite side of this polarizing beam splitter from the image forming element, the reflective type holographic optical element is disposed on the opposite side of the ¼ wavelength plate from the polarizing beam splitter, and is constructed in such a manner that the light from the image forming element is incident on the light transmitting body in a polarized state so that this light passes through the polarizing beam splitter, this light is incident on the polarizing beam splitter while being totally reflected by both surfaces of the light transmitting body, the light passes through the polarizing beam splitter and passes through the ¼ wavelength plate, the light is then incident on the reflective type holographic optical element at an angle of incidence of θ1 (°), and is diffracted/reflected at a reflection angle of θ2 (°), the light again passes through the 1/4 wavelength plate, and the light is then reflected by the polarizing beam splitter, and reaches the eye of the user together with light from the outside world that has passed through the light transmitting body, and there is a relationship of |θ1−θ2|<3 between the angle of incidence θ1 and reflection angle θ2.

In the present invention, a reflective type holographic optical element is embedded in a light transmitting body. Accordingly, the device has stable characteristics under the conditions of use; furthermore, the repetition of multiple reflection of the light rays used between the light transmitting body and the reflective type holographic optical element is eliminated, so that a deterioration on the characteristics of the hologram can be prevented.

The seventeenth invention that is used to achieve the object described above is an image display device which has an image combiner in which images formed by illuminating a reflective type holographic optical element with light from an image forming element are superimposed on light from the outside world so that double images are formed, wherein this image display device has a half-mirror disposed inside a light transmitting body, the reflective type holographic optical element is disposed on the surface of the light transmitting body that faces the outside world, and is constructed in such a manner that the light from the image forming element is incident on the light transmitting body, and is then incident on the half-mirror while being totally reflected by both surfaces of the light transmitting body, this light is reflected by the half-mirror, the light is incident on the reflective type holographic optical element at an angle of incidence of θ1 (°), and is diffracted/reflected at a reflection angle of θ2 (°), and the light passes through the half-mirror, and reaches the eye of the user together with light from the outside world that has passed through the light transmitting body, and there is a relationship of |θ1−θ2|<3 between the angle of incidence θ1 and reflection angle θ2.

The eighteenth invention that is used to achieve the object described above is an image display device which has an image combiner in which images formed by illuminating a reflective type holographic optical element with light from an image forming element are superimposed on light from the outside world so that double images are formed, wherein this image display device has a half-mirror disposed inside a light transmitting body, the reflective type holographic optical element is disposed in a position with an air gap interposed between this holographic optical element and the light transmitting body, and is constructed in such a manner that the light from the image forming element is incident on the light transmitting body, and is then incident on the half-mirror while being totally reflected by both surfaces of the light transmitting body, this light is reflected by the half-mirror, the light is incident on the reflective type holographic optical element at an angle of incidence of θ1 (°), and is diffracted/reflected at a reflection angle of θ2 (°), and the light passes through the half-mirror, and reaches the eye of the user together with light from the outside world that has passed through the light transmitting body, and there is a relationship of |θ1−θ2|<3 between the angle of incidence θ1 and reflection angle θ2.

The nineteenth invention that is used to achieve the object described above is an image display device which has an image combiner in which images formed by illuminating a reflective type holographic optical element with light from an image forming element are superimposed on light from the outside world so that double images are formed, wherein this image display device has a half-mirror disposed inside a light transmitting body, the reflective type holographic optical element is disposed inside the light transmitting body on the opposite side of the half-mirror from the image forming element, and is constructed in such a manner that the light from the image forming element is incident on the light transmitting body, and is then incident on the half-mirror while being totally reflected by both surfaces of the light transmitting body, this light passes through the half-mirror, the light is incident on the reflective type holographic optical element at an angle of incidence of θ1 (°), and is diffracted/reflected at a reflection angle of θ2 (°), and the light is reflected by the half-mirror, and reaches the eye of the user together with light from the outside world that has passed through the light transmitting body, and there is a relationship of |θ1−θ2|<3 between the angle of incidence θ1 and reflection angle θ2.

The seventeenth through nineteenth inventions described above respectively use a half-mirror instead of the polarizing beam splitter in the fourteenth and fifteenth inventions. Accordingly, the quantity of light drops to approximately ¼ of the original quantity. However, in cases where a strong light source can be used, the system can be constructed using an inexpensive half-mirror; accordingly, the cost of the apparatus as a whole can be reduced.

BEST MODE FOR CARRYING OUT THE INVENTION

Image combiners and image display devices constituting working configurations of the present invention will be described below with reference to the figures.

[First Working Configuration]

Figure 1:
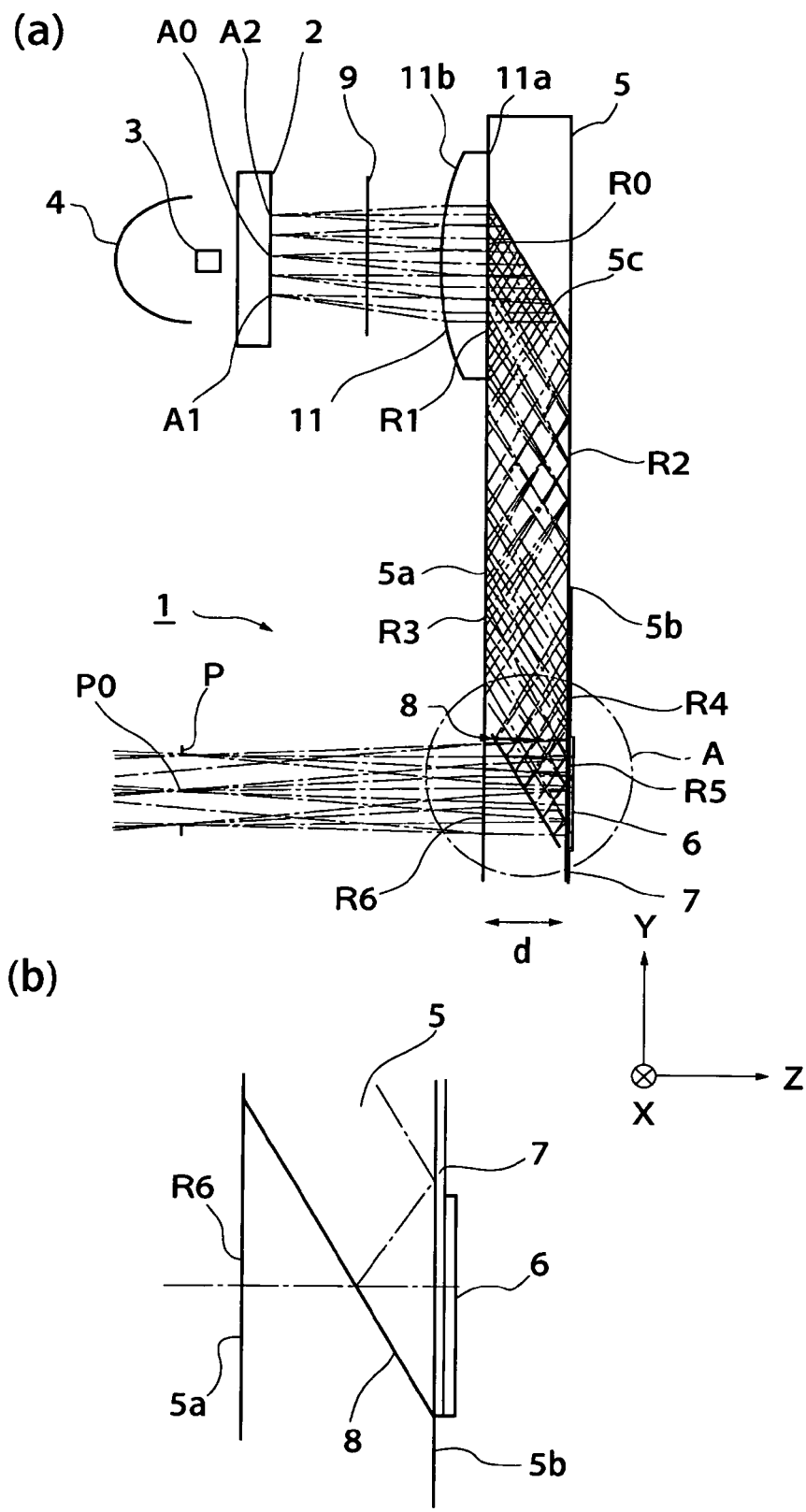
FIG. 1 is a diagram showing the construction of an image display device constituting a first working configuration of the present invention, and the schematic path of the light rays in this image display device.

FIG. 1 is a diagram showing the construction of an image display device (using an image combiner) which constitutes a first working configuration of the present invention, and the schematic path of the light rays (only the light rays from the image forming element 2) in this image display device. (a) is an overall schematic view, and (b) is a partial enlarged view of part A.

Figure 2:
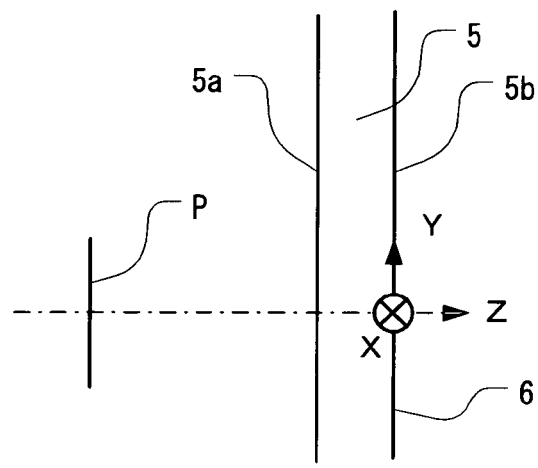
FIG. 2 is a diagram showing the coordinate system that defines the reflective type HOE used in the present invention.
Figure 3:
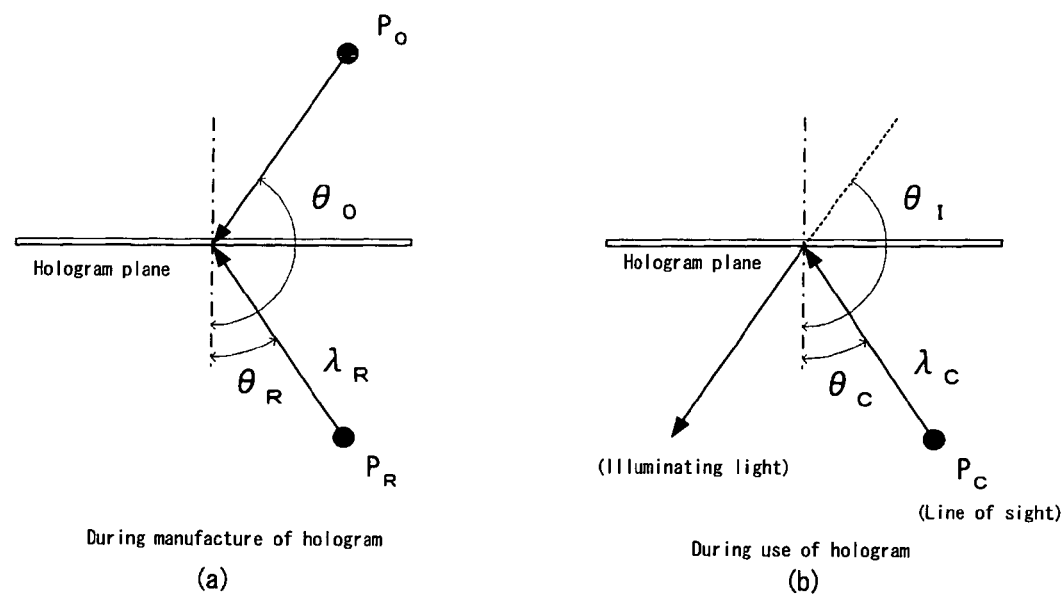
FIG. 3 is a diagram used to illustrate the characteristics of the hologram.
Figure 4:
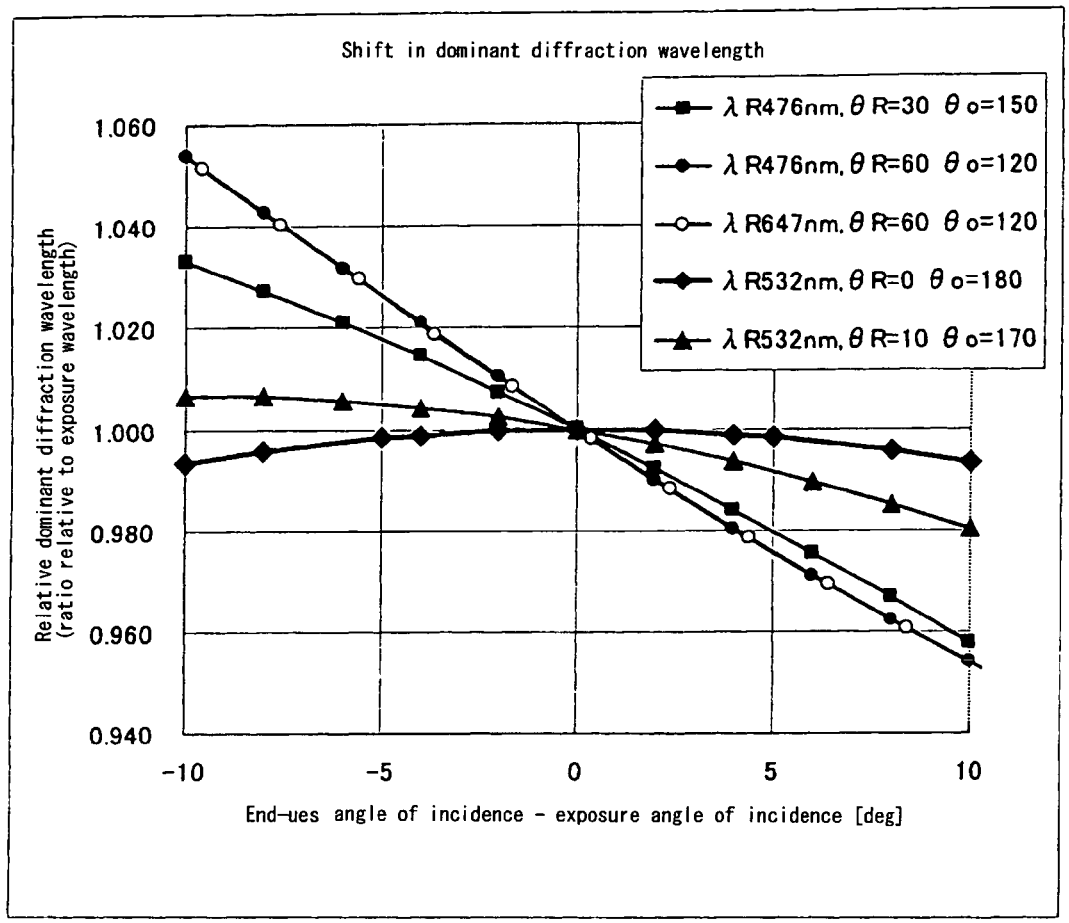
FIG. 4 is a graph showing the variation in the value of the relative dominant diffraction wavelength $\lambda C/\lambda R$ shown in Equation (5) in a case where the angle $\theta C$ of the line of sight with respect to the angle of incidence $\theta R$ of the reference light during exposure, i.e., ($\theta C - \theta R$), is varied with the angle of the exposure light taken as a parameter.

Here, an X axis, a Y axis and a Z axis that are perpendicular to each other are defined as shown in FIG. 1. Specifically, the left-right direction in the plane of the page in FIG. 1 is taken as the Z axis, and the rightward direction is taken as the plus direction of the Z coordinate value. The vertical direction in the plane of the page in FIG. 1 is taken as the Y axis, and the upward direction is taken as the plus direction of the Y coordinate value. The direction perpendicular to the plane of the page in FIG. 1 is taken as the X axis, so that a right-handed three-dimensional orthogonal coordinate system is established. Specifically, the direction of depth from the plane of the page in FIG. 1 is taken as the plus direction of the X coordinate value. Furthermore, the direction of the Y axis may coincide with the actual vertical direction, or may be some other appropriate direction. Moreover, in the description of the working configurations of the present invention, the working configurations will be described on the basis of the disposition shown in FIG. 2. Furthermore, in the figures, 5 indicates a plate-form part; the surface of this plate-form part 5 that is on the side closer to the exit pupil P of the image combiner 1 is designated as 5a, while the surface on the far side is designated as 5b. Moreover, the directions of the coordinate axes are also as shown in FIG. 2 in all of the figures illustrating the respective working configurations. However, the origin is not limited to the position shown in the figures; an arbitrary position may be used. These definitions are also true for FIGS. 6 and 12 described later.

The image display device of the present working configuration comprises an image combiner 1 and an image forming element 2. In the present working configuration, a transparent type LCD is used as the image forming element 2. The image forming element 2 is illuminated from the back by light from a light source consisting of an LED 3 and a reflective mirror 4 such as a parabolic mirror, and transmits light indicating a display image by subjecting the light from the light source to spatial optical modulation. Furthermore, some other element such as a reflective type LCD may also be used as the image forming element 2. It goes without saying that a self-light-emitting type element such as an electroluminescent light-emitting element may also be used.

The image combiner 1 comprises a plate-form part 5 which is made of an optical material such as glass or plastic, and which is constructed on a parallel flat plate (except for the upper part). Of course, for example, the plate-form part 5 may also have an optical power that is used to make a correction for the visual acuity of the user. In this case, for instance, at least one of two surfaces 5*a* and 5*b* of the plate-form part 5 that are oriented in the direction of the Z axis is formed by a curved surface. These points also apply to the respective working configurations described later. Furthermore, the plate-form part 5 also extends in the downward direction in FIG. 1; however, this is omitted from the figures.

A light conducting part 11 is formed by a planar-convex lens, and has an incident surface 11*b* consisting of a curved surface on which light from the image forming element 2 is incident, and an emitting surface 11*a* consisting of a planar surface which emits the light that is incident from the incident surface 11*b*, and causes this light to be incident in the vicinity of the upper part of the surface 5*a* of the plate-form part in FIG. 1. Furthermore, a $\lambda/2$ plate 9 is disposed between the image forming element 2 and the light conducting part 11.

The plate-form part 5 is mounted on the head of the user via a supporting member such as a frame (not shown in the figure) in the same manner as a spectacle lens, and is positioned in front of the eye (not shown in the figure) of the user. In FIG. 1, P indicates an exit pupil for light from the image forming element 2 of the image combiner 1, and P0 indicates the center of the exit pupil P. The image combiner 1 is mounted on the user so that this exit pupil P substantially coincides with the pupil of the eye of the user. Accordingly, the center P0 of the exit pupil substantially coincides with the center of the pupil of the eye of the user.

In FIG. 1, the Z-axis direction coincides with the direction of thickness of the plate-form part 5. The eye-side surface 5*a* and opposite-side surface 5*b* of the plate-form part 5 are parallel to the XY plane. Furthermore, although this is not shown in the figure, the LED 3, reflective mirror 4, image forming element 2 and light conducting part 11 are also supported by the supporting member mentioned above. As a result, the image forming element 2 is disposed in a position located above and to the left of the plate-form part 5 within the plane of the page in the figure, so that the observation of the outside world by the user is not impeded, and so that the image forming element does not create any hindrance when the user mounts this image display device. Of course, it would also be possible to dispose the image forming element 2 in some other appropriate place, and to conduct the display image to the position of the image forming element 2 in FIG. 1 by means of a relay optical system; furthermore, it would also be possible to form an image in space in this position using a scanning optical system. These points are also the same in the respective working configurations described later.

Moreover, in FIG. 1, the points A1 and A2 respectively indicate the positions of both ends of the display part of the image forming element 2 within the plane of the page in the figure. Furthermore, the point A0 indicates the center of this display part. The image combiner 1 is constructed so that the light from the image forming element 2 is conducted to the eye of the user after being superimposed on the light (hereafter referred to as "outside world light") that is transmitted through the plate-form part 5 so as to pass through the thickness d of the plate-form part 5 from the front of the plate-form part 5 (i.e., so as to be incident from the surface 5*b* and emitted from the surface 5*a*).

In the present working configuration, a $\lambda/4$ plate 7 is disposed in a range covering the regions R4 and R5 of the surface 5*b* of the plate-form part 5. This $\lambda/4$ plate is disposed so that the orientation of the axis of the $\lambda/4$ plate is either $\pm 45°$ with respect to the X axis in the XY plane shown in FIG. 1. Furthermore, a reflective type holographic optical element (reflective type HOE) 6 is disposed in the vicinity of a position facing the eye of the user (region R5) on the surface 5*b* of the plate-form part 5.

Moreover, in the present working configuration, a polarizing beam splitter (PBS) 8 is inclined at a specified angle in the counterclockwise direction with respect to the surfaces 5*a* and 5*b* as shown in FIG. 1. For example, the PBS 8 can be disposed inside the plate-form part 5 by bonding the PBS 8 to a small piece of the same material as the plate-form part 5, subsequently placing this small piece inside the mold frame that forms the plate-form part 5, pouring the material of the plate-form part 5 into the mold frame in a molten state, and then solidifying this material. Of course, methods for installing the PBS 8 inside the plate-form part 5 are not limited to this method.

A reflective surface (mirror) 5*c* is disposed in the interior portion of the plate-form part 5 in the vicinity of a position facing the surface 11*a* of the light conducting part 11. As is shown in FIG. 1, the reflective surface 5*c* is inclined at a specified angle in the counterclockwise direction with respect to the surfaces 5*a* and 5*b*. Furthermore, the portion of the plate-form part 5 that is located diagonally above the reflective surface 5*c* in FIG. 1 may be cut since light from the image forming element 2 does not pass through this portion. In this case, the reflective surface 5*c* is disposed on the surface of the plate-form part 5.

The wavelength of the light from the image forming element 2 has a wavelength width that includes the wavelength of the diffraction efficiency peak of the reflective type HOE 6; the maximum part within this wavelength width substantially coincides with the diffraction efficiency peak wavelength, and the light from the image forming element 2 is reflected by this reflective type HOE 6. Meanwhile, the reflective type HOE 6 allows the outside world light (not shown in the figures) to pass through without deflecting this light. Furthermore, it is desirable to use an element which has a high wavelength selectivity as the reflective type HOE 6 so that there is as little interference as possible with the outside world light. If an element which has respective selectivity for light of three wavelengths in narrow wavelength regions representing the respective colors of R, G and B is used as the reflective type HOE 6, the display images seen by the user can also be colorized.

As is shown in FIG. 1, the reflective type HOE 6 has characteristics that reflect the light from the image forming element 2 toward the pupil of the observer, and also has an optical power so that this HOE has a specified image focusing action. Of course, it is not absolutely necessary that the reflective type HOE 6 have an optical power. The reflective type HOE 6 may have a flat surface, or may have a curved surface. In cases where an HOE with a curved surface is used as the reflective type HOE 6, if the center of curvature of the curved surface is disposed on the side of the eye of the user, then the amount of aberration fluctuation according to the angle of view that is generated by the reflective type HOE 6 when the angle of view is large is reduced, which is desirable.

For example, photo-polymers, photo-resists, photochromic materials, photodichromic materials, silver salt emulsions, gelatin bichromate, gelatin dichromate, plastics, ferroelectric materials, magnetic optical materials, electro-optical materials, amorphous semiconductors, photo-refractive materials, and the like can be used as the hologram photosensitive material that is used to construct the reflective type HOE 6. Furthermore, the reflective type HOE 6 can be manufactured by simultaneously illuminating such a material with light from two light sources using an optical system that is used for such manufacture according to publicly known methods.

Since an LCD is used as the image forming element 2 in the present working configuration, the light that is emitted from the image forming element 2 is linearly polarized light. The axis of the λ/2 plate 9 is disposed in a direction which is such that the linearly polarized light from the image forming element 2 is linearly polarized light that is polarized in the direction of the Y axis. Light passing through an arbitrary point on the display part of the image forming element 2 (i.e., the light of the display image) passes through the λ/2 plate 9, and is subjected to the polarization plane rotating effect; this light then passes through the planar-convex lens of the light conducting part 11, and enters the interior of the plate-form part 5 from the region R0 on the surface 5*a* of the plate-form part 5.

The light that enters the interior of the plate-form part 5 from the region R0 is reflected by the reflective surface 5*c*, and is then incident on the region R1 of the surface 5*a* of the plate-form part 5 at an angle of incidence that is greater than the critical angle, so that this light is completely reflected by the region R1. This light is then incident on the region R2 of the surface 5*b* of the plate-form part 5 at an angle of incidence that is greater than the critical angle, so that this light is completely reflected by the region R2. This light is further incident on the region R3 of the surface 5*a* of the plate-form part 5 at an angle of incidence that is greater than the critical angle, so that this light is completely reflected by the region R3. This light is further incident on the region R4 of the surface 5*b* of the plate-form part 5 at an angle of incidence that is greater than the critical angle, so that this light is completely reflected by the region R4, after which the light is incident on the PBS 8.

The direction of polarization of this light is oriented in the direction of the Y axis when the light is incident on the plate-form part 5; however, when the light is completely reflected by the critical surface with air in the region R4, since the light passes twice through the λ/4 plate 7, the light is subjected to a total phase change of λ/2, so that the direction of polarization is altered by 90°, thus producing linearly polarized light that is polarized in the direction of the X axis. Specifically, since the light is converted into S polarized light and then caused to be incident on the PBS 8, the light is reflected by PBS 8.

Then, after the light enters the λ/4 plate 7 in the region R5 on the surface 5*b* and is converted into circularly polarized light, the light is subjected to a reflective diffraction effect and image focusing effect by the reflective type HOE 6. Subsequently, this light again passes through the λ/4 plate 7, and is converted into linearly polarized light with P polarization; accordingly, the light passes through the PBS 8 when the light is again incident on the PBS 8. Then, the light is emitted to the outside of the plate-form part 5 from the region R6 on the surface 5*a* of the plate-form part 5.

In this case, light emitted from the same place on the image forming element 2 is incident on the pupil of the eye of the user disposed at the exit pupil P so that an enlarged false image is formed at infinity or at a specified distance (600 mm in the concrete examples described later) from the exit pupil P.

The light that reaches the eye of the user after being emitted from the image forming element 2 and being diffracted/reflected by the reflective type HOE 6 ordinarily has only one wavelength region component in accordance with the emission spectrum characteristics of the LED 3 and the wavelength selectivity of the reflective type HOE 6. However, for example, in cases where a white LED is used as the LED 3, and a color reflective type HOE is used as the reflective type HOE 6, the light has a plurality of discrete wavelength region components. Here, among the light that reaches the eye of the user after being emitted from the image forming element 2 and being diffracted/reflected by the reflective type HOE 6, we will consider light rays that are emitted from the center A0 of the image forming element 2 and that reach the center of the exit pupil P. Here, the light rays (among these light rays) which have substantially the center wavelength of the single wavelength region, or substantially the center wavelength of the wavelength region located closest to the short wavelength side among the plurality of wavelength regions, and which constitute the center of the light beam, will be called the "principal rays."

Here, a concrete example of the first working configuration will be described. In the design of this concrete example, Code V (commercial name) manufactured by the U.S. firm of Optical Research Associates, which is well known in this technical field, was used as the design program. In this case, the path of the light rays emitted from the center of A0 of the display part of the image forming element 2 and passing through the center P0 of the exit pupil P is defined as the optical axis of this optical device as a whole. In this concrete example, the optical axis is not a single straight line, but rather has a shape in which mutually inclined line segments are connected. These points are also the same in the concrete examples of the respective working configurations described later.

The various optical quantities of this concrete example are as described below.

The diameter of the exit pupil P is 3 mm. The visual field angle in the upward direction within the plane of the page in the figure is 5°. The visual field angle in the downward direction within the plane of the page in the figure is −5°. The visual field angle in the direction of depth of the page is ±6.67°. The screen size in the plane of the page in the figure (i.e., the length between the point A1 and the point A2) is 3.6 mm. The screen size in the direction of depth of the page is 4.8 mm. The thickness d of the plate-form part 5 is 3.4 mm. The wavelength used is the wavelength width from approximately 480 nm to approximately 540 nm. The refractive index nd of the plate-form part 5 with respect to a wavelength of 587.56 nm (d line) is 1.593947, and the Abbe number vd is 34.99.

With regard to the definition of the reflective type HOE 6, the hologram is definitively defined by defining the two light beams that are used for exposure. The two light beams are defined by the positions of the light sources and either the convergence (VIR) or divergence (REA) of the beams emitted from the respective light sources. The coordinates of the first point light source (HV1) are designated as (HX1, HY1, HZ1), and the coordinates of the second point light source are designated as (HX2, HY2, HZ2). In the case of these coordinates, as is shown in FIG. 2, the point of intersection between the HOE plane and the optical axis is taken as the origin, the Z axis is taken in the direction of the optical axis, the upward direction in the plane of the page within the HOE plane is taken as the Y axis, and the direction of depth of the page is taken as the X axis.

Furthermore, an emulsion with a thickness of 29 μm, a refractive index of 1.493 and a refractive index modulation of 0.0224 is used as the emulsion that records the hologram. The exposure wavelength is 532 nm. The HOE 6 has a phase function component in order to optimize the image focusing performance.

To describe the phase function here, the phase function is a function that defines the amount of aspherical phase conversion other than that defined by the two pure point light sources of the reflective type HOE 6; in the optical design program Code V, this can be designated using polynomial coefficients of the X- and Y-axis components or the like. Moreover, the various quantities used for ray tracing in this concrete example are shown in Table 3 below. The order of the optical planes (order of the plane numbers) runs from the plane of the pupil of the eye of the user (=plane of the exit pupil P of the image combiner 1) to the image forming element 2. Furthermore, in Table 3, the reference symbols in FIG. 1 corresponding to the respective plane numbers are indicated as "symbols" in parentheses. This point is also the same in tables described later.

TABLE 3

| Plane number (symbol) | Curvature radius | Medium nd | vd | |
|---|---|---|---|---|
| 1 (P) | INFINITY | | | |
| 2 (5a:R6) | INFINITY | 1.593947 | 34.99 | |
| 3 (6) | INFINITY | | | Reflective plane |
| | Hologram plane: | | | |
| | Definition of two light beams | | | |
| HV1: REA | HV2: VIR | | | |
| HX1: 0.00E+00 | HY1: 0.00E+00 | HZ1: −1.00E+20 | | |
| HX2: 0.00E+00 | HY2: 0.00E+00 | HZ2: −1.00E+20 | | |
| | Phase coefficient | | | |
| C2: −1.3961E−03 | C3: −1.5268E−02 | C5: −1.5191E−02 | | |
| C7: −3.5978E−05 | C9: 1.9832E−05 | C10: 7.9613E−05 | | |
| C12: −3.7097E−05 | C14: 8.8185E−05 | C16: 3.3655E−06 | | |
| C18: −2.8274E−05 | C20: −1.0574E−05 | C21: −3.7068E−06 | | |
| C23: 6.0702E−05 | C25: 5.4549E−05 | C27: −1.3250E−05 | | |
| C29: −3.8022E−07 | C31: 3.0072E−06 | C33: 6.5074E−06 | | |
| C35: 5.6006E−07 | C36: 2.9292E−07 | C38: −5.8795E−06 | | |
| C40: −1.2793E−05 | C42: −5.5345E−06 | C44: 1.7524E−06 | | |
| C46: 2.3290E−08 | C48: −1.9552E−07 | C50: −1.3657E−07 | | |
| C52: −7.4316E−07 | C54: 1.3560E−07 | C55: −1.0775E−08 | | |
| C57: 1.8148E−07 | C59: 6.0826E−07 | C61: 6.0669E−07 | | |
| C63: 2.8538E−07 | C65: −1.2153E−07 | | | |
| 4 (8) | INFINITY | 1.593947 | 34.99 | Reflective plane |
| 5 (5b:R4) | INFINITY | 1.593947 | 34.99 | Reflective plane |
| 6 (5a:R3) | INFINITY | 1.593947 | 34.99 | Reflective plane |
| 7 (5b:R2) | INFINITY | 1.593947 | 34.99 | Reflective plane |
| 8 (5a:R1) | INFINITY | 1.593947 | 34.99 | Reflective plane |
| 9 (5c) | INFINITY | 1.593947 | 34.99 | Reflective plane |
| 10 (5a:R0) | INFINITY | | | |
| 11 (11a) | INFINITY | 1.593947 | 34.99 | |
| 12 (11b) | 13.1934 | | | |
| 13 (2) | INFINITY | | | |

The definition of the phase function used in Table 3 expresses the optical path difference to which the light rays incident on a point designating the reflective type HOE 6 as a position on the XY coordinate plane are subjected as a value that is normalized by the wavelength used; if m and n are assumed to be integers, then this is determined by designating polynomial coefficients expressed by Equation (7) in the general form shown below. Here, $C_{00}=0$.

$$\sum_{m=0}^{10}\sum_{n=0}^{10} C_{mn} X^m Y^n \tag{7}$$

Up to 65 such coefficients can be designated; in order, these are called $C_1, C_2, C_3, \ldots, C_{65}$, and when the order of the coefficients is expressed by integers j, then a correspondence is established so that the relationship expressed by Equation (8) shown below holds true between the integers m and n that indicate the order numbers of the X coordinates and Y coordinates.

$$j=\{(m+n)^2+m+3n\}/2 \tag{8}$$

Specifically, in the present example, the phase function is defined by the polynomial equation of Equation (9) shown below. Such a definition of the phase function is also the same for tables described later.

$$C_1 X + C_2 Y + C_3 X^2 + C_4 XY + C_5 Y^2 + \ldots C_{65} Y^{10} \tag{9}$$

Furthermore, with regard to the positional relationship of the respective optical planes in the present concrete example, the absolute positions of the centers of the respective optical planes with the center of the first plane (plane No. 1=symbol P in FIG. 1) taken as the origin (X, Y, Z)=(0, 0, 0), and the amounts of rotation of these planes about the X axis (values measured with the counterclockwise rotation taken as the positive), are shown in Table 4 below.

TABLE 4

| Plane No. (symbol) | X coordinate value | Y coordinate value | Z coordinate value | Rotational angle about X axis [degree] |
|---|---|---|---|---|
| 1 (P) | 0 | 0 | 0 | 0 |
| 2 (5a:R6) | 0 | 0 | 13 | 0 |
| 3 (6) | 0 | 0 | 16.4 | 0 |
| 4 (8) | 0 | 0 | 14.7 | 30 |
| 5 (5b:R4) | 0 | 2.9356 | 16.4 | 0 |
| 6 (5a:R3) | 0 | 8.81272 | 13 | 0 |
| 7 (5b:R2) | 0 | 14.68984 | 16.4 | 0 |
| 8 (5a:R1) | 0 | 20.56697 | 13 | 0 |
| 9 (5c) | 0 | 23.33426 | 14.7 | 29 |
| 10 (5a:R0) | 0 | 23.33426 | 13 | 0 |
| 11 (11a) | 0 | 23.33426 | 12.9 | 0 |
| 12 (11b) | 0 | 23.33426 | 10.9 | 0 |
| 13 (2) | 0 | 23.86418 | 3.72563 | 0 |

When the diffraction efficiency is calculated for the present concrete example, the dominant diffraction efficiency wavelengths of the principal rays at angles of view of −5°, 0° and +5°, and the dominant diffraction efficiency wavelengths of the light rays at the end and center of the pupil coordinates at the respective angles of view, are as shown in Table 5 below.

TABLE 5

| Angle of View | | −5° | 0° | +5° |
|---|---|---|---|---|
| Pupil Coordinates | End | 531 | 531.9 | 530.9 |
| | Center | 531.4 | 531.9 | 531.5 |

Figure 5:
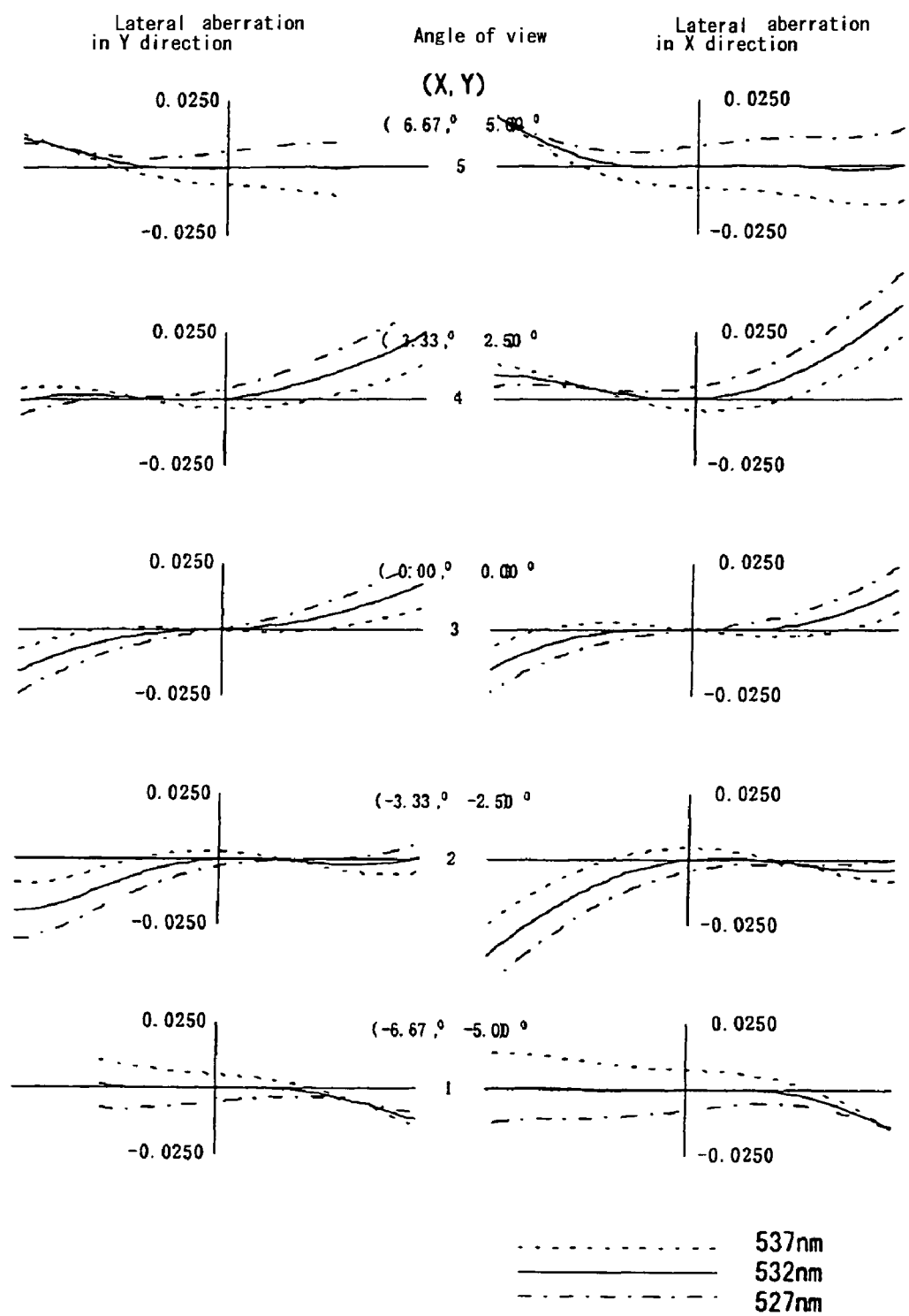
FIG. 5 is a diagram of lateral aberration in a concrete example of the first working configuration of the present invention.

It is seen from Table 5 that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 5. The lateral aberration of light rays with a dominant diffraction wavelength of ±5 nm is simultaneously shown for each angle of view in a single diagram. It is seen from FIG. 5 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0.05°, and the angle of reflection/diffraction θ2 at the time of diffraction/reflection of these principal rays is 0°, so that the conditions described above are satisfied. As a result, as is seen from the content already described, there is no shift in the diffraction wavelength according to the angle of the line of sight, so that the image quality of the display image can be improved.

Furthermore, in the case of the reflective type HOE 6 of the concrete example of the present working configuration, the first light source and the second light source have opposite orientations in the normal direction of the reflective type HOE 6, and the first light source is at a distance of infinity. Accordingly, when the reflective type HOE 6 of the present working configuration is manufactured, the reference wave is a planar wave, and the object wave is an aspherical wave front that passes through the exposure lens system formed by an exposure lens that produces a wave front equivalent to the phase conversion effect of the designed phase coefficients. In this case, the reference wave and object wave can be set coaxially in the normal direction of the reflective type HOE 6, so that the advantage of easy axial alignment of the exposure optical system is obtained.

The reflective type HOE 6 in the present working configuration is joined to the region R5 on the surface 5b of the plate-form part 5; the effective region of this reflective type HOE 6 overlaps in spatial terms with the region R4 on the same surface 5b. Accordingly, when the light beam from the image forming element is completely reflected by the region R4, this light beam passes through the reflective type HOE 6. The effect of this will be examined. Since θR and θ0 in the present working configuration are set so that θR=0° and θ0=180°, the wavelength shift phenomenon behaves in accordance with Equation (10).

$$\lambda_C/\lambda_R = \cos \theta_C \quad (10)$$

Here, $\theta_C$ is the angle of incidence in the emulsion; accordingly, Equation (10) can be rewritten as follows where $\theta_{C1}$ is the angle of incidence inside the plate-form part, n1 is the refractive index, and n2 is the refractive index of the emulsion:

$$\lambda_C/\lambda_R = \cos[arc\sin\{(n1/n2) \times \sin \theta_{C1}\}] \quad (11)$$

The angle of incidence on the HOE 6 when the light beam passes through the region R4 inside the plate-form part is approximately 60°. Assuming that $\theta_{C1}$=60°, then the value of $\lambda_C/\lambda_R$ in Equation (11) is 0.372, and in a case where the exposure wavelength λR of the present working configuration is 532 nm, $\lambda_C$=198 nm.

Specifically, it is seen that the dominant diffraction wavelength when the light is incident on the reflective type HOE 6 of the present working configuration in the region R4 at an angle of incidence of 60° is 198 nm. Such a short-wavelength spectrum is not included in the LED 3 used as a light source. Accordingly, even if light from the image forming element is incident on the reflective type HOE 6 in the region R4, diffraction does not occur, and the light is simply totally reflected by the interface with air, so that there is no deleterious affect on image focusing.

Even in a case where the exposure wavelength is set at 647 nm in red light in the present working configuration, similar calculations show that the dominant diffraction wavelength in the region R4 is 241 nm; since this is in the ultraviolet region, it is seen that there is no deleterious effect on image focusing. Accordingly, in the concrete example of the present working configuration, as in the second and third working configurations described later, a full color image display device can be obtained by designing HOEs 6 corresponding to R, G and B, and multiplexing.

[Second Working Configuration]

Figure 6:
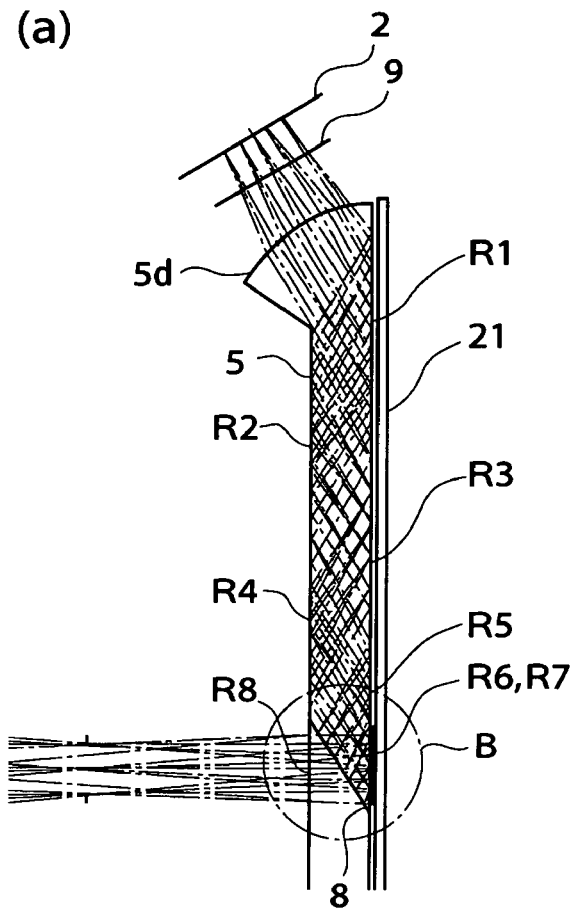
FIG. 6 is a diagram showing the construction of an image display device constituting a second working configuration of the present invention, and the schematic path of the light rays in this image display device.
Figure 6:
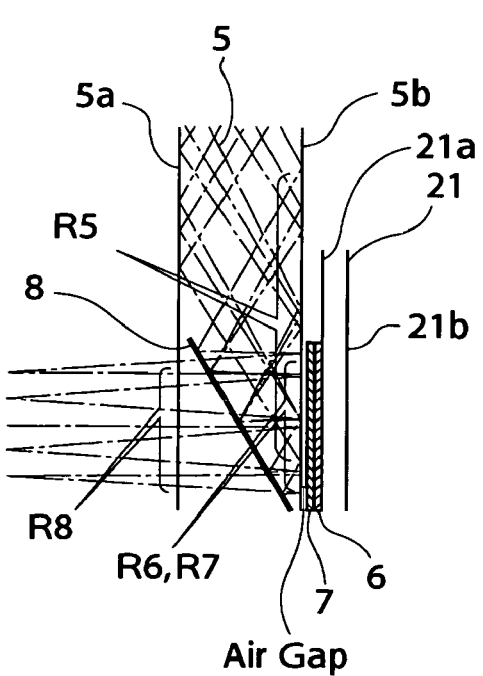

FIG. 6 is a diagram showing the construction of an image display device constituting a second working configuration of the present invention, and the path of the light rays (only the light rays from the image forming element 2) in this image display device. In FIG. 6, elements that are the same as elements in FIG. 1, or that correspond to elements in FIG. 1, are labeled with the same symbols, and a redundant description is omitted. Furthermore, the depiction of the LED 3 and reflective mirror 4 that constitute the light source shown in FIG. 1 is omitted from FIG. 6. Furthermore, (a) is an overall schematic view, and (b) is a partial enlarged view of part B.

The present working configuration basically differs from the first working configuration in that a separate thin plate-form part 21 is installed on the outside of the surface 5b of the plate-form part 5 with an air gap interposed. Furthermore, the λ/4 plate 7 and reflective type HOE 6 are disposed on the surface 21a of the plate-form part 21 that is located on the side of the user in a position facing the line of sight of the user.

Moreover, in the present working configuration, the axis of the λ/2 plate 9 is disposed in an orientation which is such that the linearly polarized light from the image forming element is converted into linearly polarized light that is polarized in the direction of the X axis. Since this light is S polarized light when incident on the PBS 8, the light is reflected by the PBS 8, and converted into circularly polarized light by the λ/4 plate 7, so that the light is subjected to the reflective/diffractive action and image focusing action of the reflective type HOE 6. Then, the light again passes through the λ/4 plate, and is converted into P polarized light; when this light is again incident on the PBS 8, the light is transmitted toward the eye of the user. Furthermore, a light conducting part 11 is not used in the present working configuration; a surface 5d is formed on the upper left part of the plate-form part, and this surface 5d has a rotationally symmetrical aspherical shape.

Figure 18:
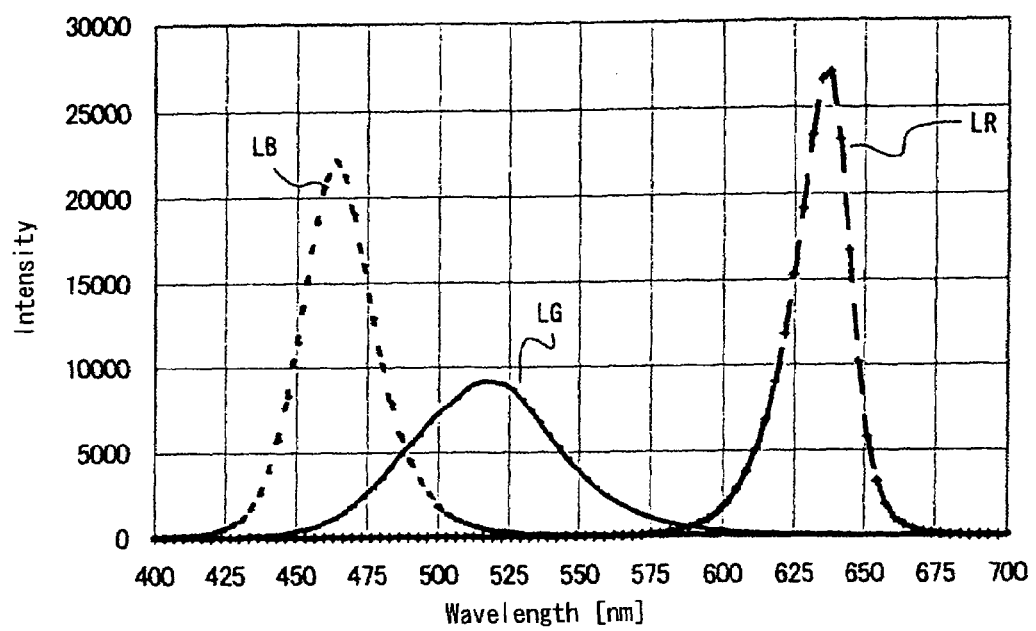
FIG. 18 is a diagram showing the emission spectrum of the LED light source used in the concrete examples of the second and third working configurations.

In addition, a three-color LED is used as the LED 3 that constitutes the light source. FIG. 18 shows the emission spectrum of the LED 3. In FIG. 18, the line LR indicates the emission spectrum of the red light emitting part of the LED 3, the line LG indicates the emission spectrum of the green light emitting part of the LED 3, and the line LB indicates the emission spectrum of the blue light emitting part of the LED 3. As is seen from FIG. 18, the light emitted by the LED 3 has respective peak wavelengths in the respective wavelength regions of the R (red) wavelength region, G (green) wavelength region and B (blue) wavelength region, and has respective intensities in the respective wavelength regions that extend on either side of the respective peak wavelengths. The full width at half maximum of the spectral intensity at the peak wavelength in the R wavelength region of this LED 3 is 23 nm, the full width at half maximum of the spectral intensity at the peak wavelength in the G wavelength region is 60.8 nm, and the full width at half maximum of the spectral intensity at the peak wavelength in the B wavelength region is 29 nm. These points also apply to the respective working configurations described later.

<First Concrete Example>

A first concrete example of the present working configuration will be described with reference to FIG. 6. The optical quantities of this concrete example are as follows:

The diameter of the exit pupil P is 3 mm. The visual field angle in the upward direction within the plane of the page in the figure is 5°. The visual field angle in the downward direction within the plane of the page in the figure is −5°. The visual field angle in the direction of depth of the page is ±6.67°. The screen size in the plane of the page in the figure (i.e., the length between the point A1 and the point A2 in FIG. 1) is 3.6 mm. The screen size in the direction of depth of the page is 4.8 mm. The thickness d of the plate-form part 5 is 3.4 mm. The plate-form part 5 uses the same material as in the concrete example of the first working configuration described above.

Furthermore, the various quantities used for ray tracing in this first concrete example are shown in Table 6 below. The order of the optical planes (order of the plane numbers) runs from the plane of the pupil of the eye of the user (=plane of the exit pupil P of the image combiner 1) to the image forming element 2. Here, extremely thin sheet-form wavelength plates corresponding to the wide band used to correct the polarization of the illuminating light of the liquid crystal screen are used as the λ/4 plate 7 and λ/2 plate 9. Since the thickness can be ignored, this is omitted in ray tracing. This is also true in other working configurations of the present invention.

The definition of the phase function of the HOE plane used in Table 4 is expressed as a rotationally symmetrical polynomial equation in which the HOE is expressed as $R^2=X^2+Y^2$; accordingly, the coefficients are powers of $R^2$ in ascending order, from $R^2$ to $R^{20}$.

Specifically, the phase function is expressed by the following equation:

$$\sum_{j=1}^{10} C_j R^{2j}$$

Furthermore, the aspherical surface of plane No. 12 expresses a higher-order aspherical surface defined by the following equation:

$$Z(r) = \frac{cr^2}{1+\sqrt{1-(1+k)c^2 r^2}} + Ar^4 + Br^6 + Cr^8 + Dr^{10} + Er^{12} + Fr^{14} + Gr^{16} + Hr^{18} + Jr^{20}$$

Here, $r^2=x^2+y^2$, c is the curvature, k is a conic constant, and A, B, C, D, E, F, G, H and J are aspherical surface coefficients.

Furthermore, with regard to the positional relationship of the respective optical planes in the present concrete example, the absolute positions of the centers of the respective optical planes with the center of the first plane (plane No. 1=symbol P in FIG. 1) taken as the origin (X, Y, Z)=(0, 0, 0), and the amounts of rotation of these planes about the X axis (values measured with the counterclockwise rotation taken as the positive), are shown in Table 7 below.

TABLE 7

| Plane No. (symbol) | X coordinate value | Y coordinate value | Z coordinate value | Rotational angle about X axis [degree] |
|---|---|---|---|---|
| 1 (P) | 0.0000 | 0.0000 | 0.0000 | 0.0000 |
| 2 (5a:R7) | 0.0000 | 0.0000 | 13.0000 | 0.0000 |
| 3 (5b:R6) | 0.0000 | 0.0000 | 16.4000 | 0.0000 |
| 4 (6) | 0.0000 | 0.0000 | 16.5000 | 0.0000 |
| 5 (5b:R6) | 0.0000 | 0.0000 | 16.4000 | 0.0000 |
| 6 (8) | 0.0000 | 0.0000 | 14.7000 | 30.0000 |
| 7 (5b:R5) | 0.0000 | 0.0000 | 16.4000 | 0.0000 |
| 8 (5a:R4) | 0.0000 | 0.0000 | 13.0000 | 0.0000 |
| 9 (5b:R3) | 0.0000 | 0.0000 | 16.4000 | 0.0000 |
| 10 (5a:R2) | 0.0000 | 0.0000 | 13.0000 | 0.0000 |
| 11 (5b:R1) | 0.0000 | 0.0000 | 16.4000 | 0.0000 |
| 12 (5c) | 0.0000 | 33.0000 | 12.6444 | −59.9485 |
| 13 (2) | 0.0000 | 38.1935 | 9.6397 | −59.9485 |

When the diffraction efficiency is calculated for the present concrete example, the dominant diffraction efficiency wavelengths of the principal rays at angles of view of −5°, 0° and +5°, and the dominant diffraction efficiency wavelengths of the principal rays at the end and center of the pupil coordinates at the respective angles of view, are as shown in Table 8 below.

TABLE 8

| | Angle of View | −5° | 0° | +5° |
|---|---|---|---|---|
| Pupil Coordinates | End | 531 | 531.9 | 531 |
| | Center | 531.3 | 531.9 | 531.3 |

TABLE 6

| Plane number (symbol) | Curvature radius | Medium nd | vd | |
|---|---|---|---|---|
| 1 (P) | INFINITY | | | |
| 2 (5a:R7) | INFINITY | 1.593947 | 34.99 | |
| 3 (5b:R6) | INFINITY | | | |
| 4 (6) | INFINITY | | | Reflective plane |

Hologram plane:
Definition of two light beams

| HV1: REA | HV2: VIR | | |
|---|---|---|---|
| HX1: 0.00E+00 | HY1: 0.00E+00 | | HZ1: −1.0000E+20 |
| HX2: 0.00E+00 | HY2: 0.00E+00 | | HZ2: −3.9313E+01 |

Phase coefficient

| C2: | −6.4453E−05 | C3: | 7.2525E−05 | C4: | −3.2871E−05 |
|---|---|---|---|---|---|
| C5: | 7.5531E−06 | C6: | −7.3339E−07 | C7: | −1.0785E−08 |
| C8: | 8.0622E−09 | C9: | −5.9905E−10 | C10: | 1.4388E−11 |

| 5 (5b:R6) | INFINITY | 1.593947 | 34.99 | |
| 6 (8) | INFINITY | 1.593947 | 34.99 | Reflective plane |
| 7 (5b:R5) | INFINITY | 1.593947 | 34.99 | Reflective plane |
| 8 (5a:R4) | INFINITY | 1.593947 | 34.99 | Reflective plane |
| 9 (5b:R3) | INFINITY | 1.593947 | 34.99 | Reflective plane |
| 10 (5a:R2) | INFINITY | 1.593947 | 34.99 | Reflective plane |
| 11 (5b:R1) | INFINITY | 1.593947 | 34.99 | Reflective plane |
| 12 (5c) | 7.37496 | | | |

Aspherical surface:

| K: | 0 | | | | |
|---|---|---|---|---|---|
| A: | −1.3468E−03 | B: | 5.0318E−05 | C: | 4.0988E−07 |
| D: | −2.0478E−07 | E: | 2.8577E−09 | F: | 2.9011E−10 |
| G: | −1.0642E−12 | H: | −4.9642E−13 | J: | 9.8608E−15 |

| 13 (2) | INFINITY | | | |

Figure 7:
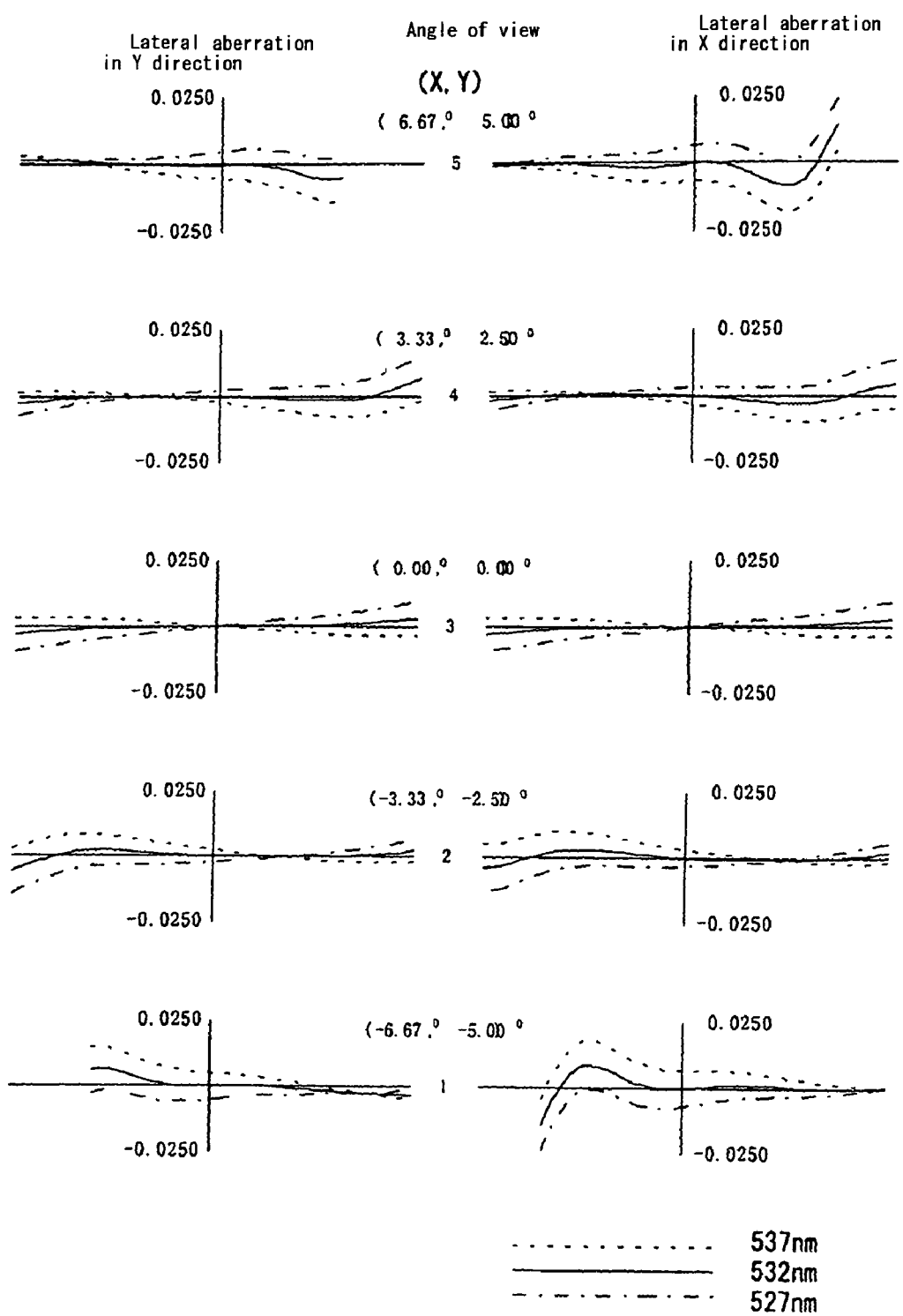
FIG. 7 is a diagram of lateral aberration in a first concrete example of the second working configuration.

It is seen from Table 8 that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 7. The lateral aberration of light rays with a dominant diffraction wavelength of ±5 nm is simultaneously shown for each angle of view in a single diagram. It is seen from FIG. 7 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0°, and the angle of reflection/diffraction θ2 at the time of diffraction/reflection of these principal rays is also 0°, so that the conditions described above are satisfied. As a result, as is seen from the content already described, there is no shift in the diffraction wavelength according to the angle of the line of sight, so that the image quality of the display image can be improved.

<Second Concrete Example>

Next, a second concrete example of the present working configuration will be described. The construction of this concrete example is completely the same as that of the first concrete example shown in FIG. 6; only the exposure wavelength and phase coefficients of the reflective type HOE 6 are different. The phase coefficients of the reflective type HOE 6 in this second concrete example are shown in Table 9 below.

TABLE 9

| Plane number (symbol) | Curvature radius | | | | |
|---|---|---|---|---|---|
| 4 (6) | INFINITY | | Reflective plane | | |
| | Hologram plane: Definition of two light beams | | | | |
| HV1: REA | HV2: VIR | | | | |
| HX1: 0.0000E+00 | HY1: 0.0000E+00 | | HZ1: −1.0000E+20 | | |
| HX2: 0.0000E+00 | HY2: 0.0000E+00 | | HZ2: −3.8702E+01 | | |
| | Phase coefficient | | | | |
| C2: 3.5403E−04 | C3: −2.0145E−04 | | C4: 6.5092E−05 | | |
| C5: −9.0691E−06 | C6: −2.6084E−07 | | C7: 2.5628E−07 | | |
| C8: −3.3670E−08 | C9: 1.8982E−09 | | C10: −4.0511E−11 | | |

When the diffraction efficiency is calculated for the present concrete example, the dominant diffraction efficiency wavelengths of the principal rays at angles of view of −5°, 0° and +5°, and the dominant diffraction efficiency wavelengths of the principal rays at the end and center of the pupil coordinates at the respective angles of view, are as shown in Table 10 below.

TABLE 10

| | Angle of View | −5° | 0° | +5° |
|---|---|---|---|---|
| Pupil Coordinates | End | 475.6 | 476.4 | 475.6 |
| | Center | 475.9 | 476.4 | 475.9 |

Figure 8:
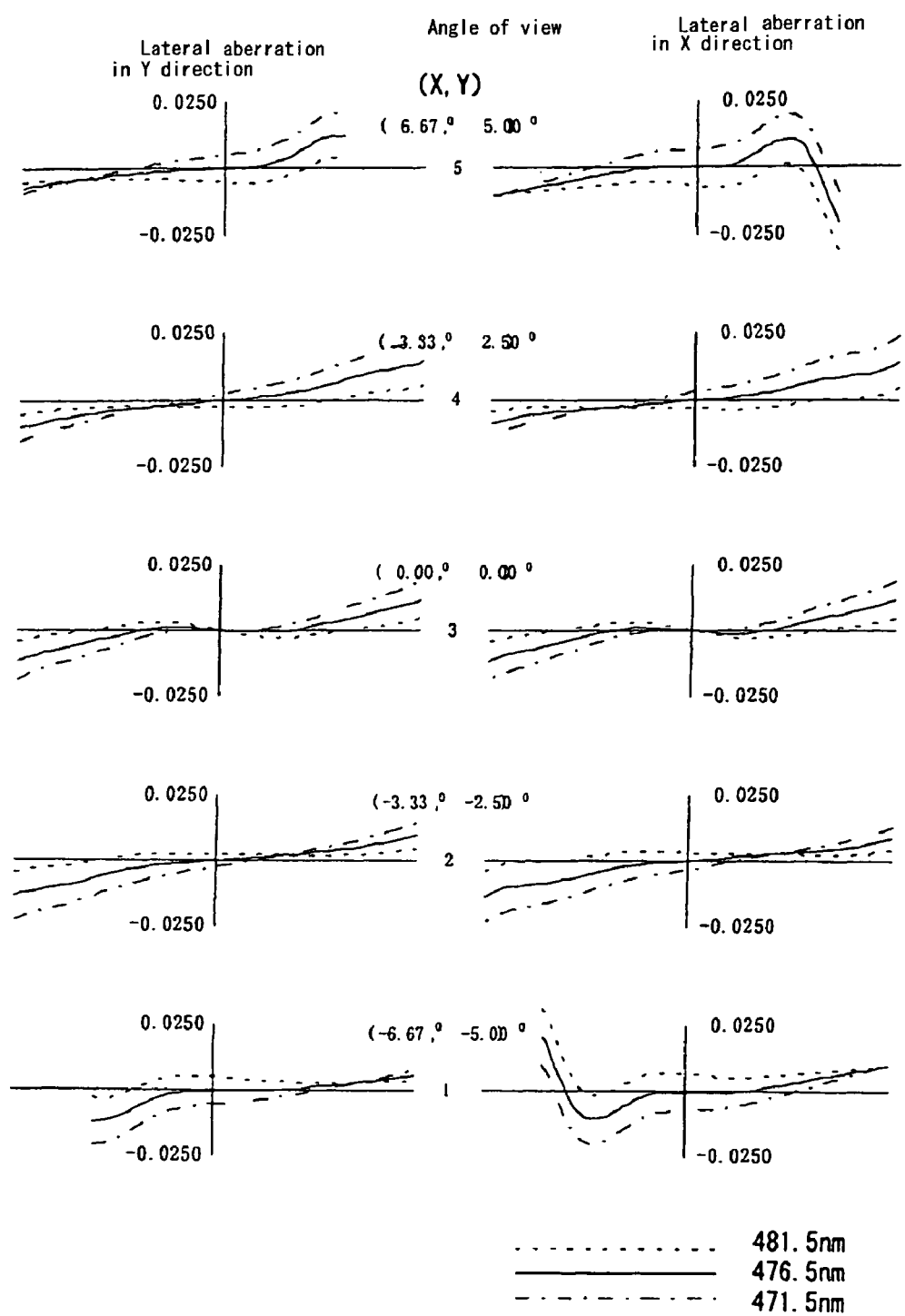
FIG. 8 is a diagram of lateral aberration in a second concrete example of the second working configuration.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 8. The lateral aberration of light rays with a dominant diffraction wavelength of ±5 nm is simultaneously shown for each angle of view in a single diagram. It is seen from FIG. 8 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0°, and the angle of reflection/diffraction θ2 at the time of diffraction/reflection of these principal rays is also 0°, so that the conditions described above are satisfied. As a result, as is seen from the content already described, there is no shift in the diffraction wavelength according to the angle of the line of sight, so that the image quality of the display image can be improved.

<Third Concrete Example>

Furthermore, a third concrete example of the present working configuration will be described. The construction of this concrete example is completely the same as that of the first concrete example shown in FIG. 6; only the exposure wavelength and phase coefficients of the reflective type HOE 6 are different. The phase coefficients of the reflective type HOE 6 in this third concrete example are shown in Table 11 below.

TABLE 11

| Plane number (symbol) | Curvature radius | Medium nd | vd | |
|---|---|---|---|---|
| 4 (6) | INFINITY | | Reflective plane | |
| | Hologram plane: Definition of two light beams | | | |
| HV1: REA | HV2: VIR | | | |
| HX1: 0.0000E+00 | HY1: 0.0000E+00 | HZ1: −1.0000E+20 | | |
| HX2: 0.0000E+00 | HY2: 0.0000E+00 | HZ2: −3.8578E+01 | | |
| | Phase coefficient | | | |
| C2: 9.0264E−08 | C3: 3.8658E−05 | C4: −2.5888E−05 | | |
| C5: 1.1089E−05 | C6: −3.0443E−06 | C7: 5.0395E−07 | | |
| C8: −4.7722E−08 | C9: 2.3657E−09 | C10: −4.7456E−11 | | |

When the diffraction efficiency is calculated for the present concrete example, the dominant diffraction efficiency wavelengths of the principal rays at angles of view of −5°, 0° and +5°, and the dominant diffraction efficiency wavelengths of the principal rays at the end and center of the pupil coordinates at the respective angles of view, are as shown in Table 12 below.

TABLE 12

| | Angle of View | −5° | 0° | +5° |
|---|---|---|---|---|
| Pupil Coordinates | End | 645.7 | 646.9 | 645.7 |
| | Center | 646.2 | 646.9 | 646.2 |

Figure 9:
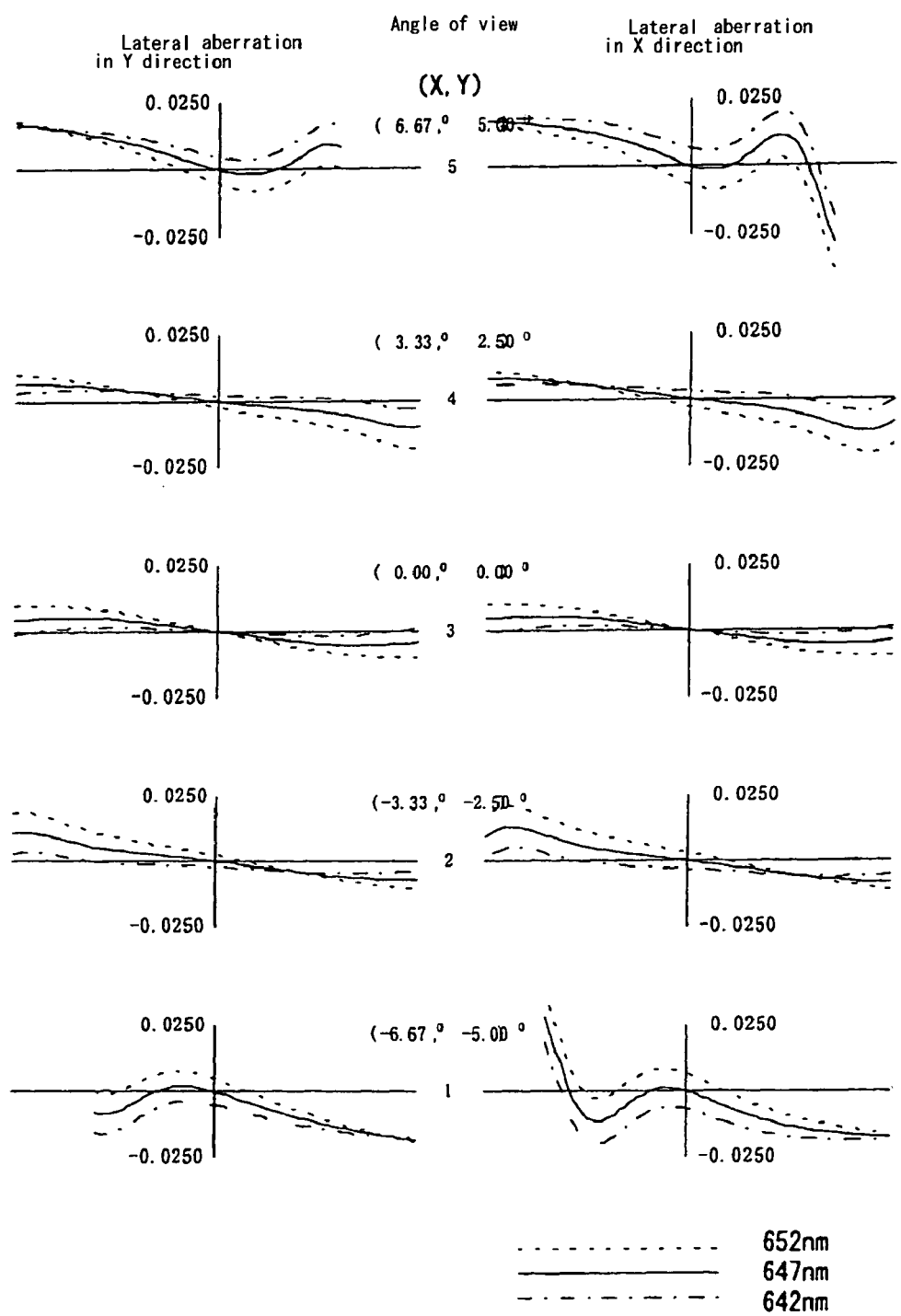
FIG. 9 is a diagram of lateral aberration in a third concrete example of the second working configuration.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 9. The lateral aberration of light rays with a dominant diffraction wavelength of ±5 nm is simultaneously shown for each angle of view in a single diagram. It is seen from FIG. 9 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0°, and the angle of reflection/diffraction θ2 at the time of diffraction/ reflection of these principal rays is also 0°, so that the conditions described above are satisfied. As a result, as is seen from the content already described, there is no shift in the diffraction wavelength according to the angle of the line of sight, so that the image quality of the display image can be improved.

In the present working configuration, since another plate-form part 21 is installed with an air gap interposed, even if the regions R7 and R6, which are transmitting surfaces of the surface 5b of the plate-form part 5 overlap with the region R5, which is a reflective surface, the λ/4 plate 7 and reflective type HOE 6 are optically separated from the region R5, which is a reflective surface, so that an optical effect by the λ/4 plate 7 or reflective type HOE 6 can be prevented when the light rays are reflected by the region R5. Accordingly, the λ/4 plate 7 and reflective type HOE 6 can be disposed in a position that is substantially equivalent to the region R7 in spatial terms. Consequently, the size of the λ/4 plate 7 can be kept to the necessary minimum limit of only the effective diameter of the regions R7 and R6. The size of this other plate-form part 21 may be any size that is sufficient to cover the size of the λ/4 plate 7 and reflective type HOE 6; however, in consideration of the external appearance when this is used as an ocular type image combiner, a size that is equal to the plate-form part 5, i.e., the ocular lens as a whole, may also be used.

Furthermore, the other plate-form part 21 may have a shape that has a curvature. For example, this plate-form part 21 may be formed in a shape having a power that corrects for the visual acuity of the user as proposed by the present inventor in Japanese Patent Application No. 2002-178363.

Moreover, in the present working configuration, unlike the first working configuration, there is no multiple reflection of the light from the image forming element by the HOE planes. As has already been determined above, this multiple reflection has no effect in the first working configuration. However, in cases where the design conditions change so that such an effect appears, the effects of multiple reflection can be securely eliminated by using a construction such as that of the present working configuration.

In the present working configuration, it goes without saying that the first through third concrete examples may be formed as respectively different monochromatic image display devices. However, it would also be possible to form a three-layer structure by respectively superimposing the reflective type HOEs 6 of the first through third concrete examples. Furthermore, similarly multiplexed reflective type HOEs 6 can also be obtained by a method in which HOEs corresponding to R, G and B of the first through third concrete examples are exposed in a single-layer emulsion that is photo-sensitive to a broad band of wavelengths, or in an emulsion in which three photosensitive and recording layers that have photosensitive effects corresponding to the respective wavelength regions are joined beforehand with barrier layers interposed.

In this case, when light of three wavelength regions from the LED passes through the image forming element, one display unit of the image display element may be spatially divided into three parts, and these may be respectively used as dots corresponding to R, G and B, so that corresponding images are displayed. Alternatively, one display unit may be temporally divided, so that images respectively corresponding to R, G and B are switched and displayed, for example, every 1/60 of a second, and the timing of the emission of light of the three wavelength regions of the LED may be synchronized with this. Then, the image information of the respective wavelength regions is subjected to a diffraction effect and image focusing effect in the corresponding HOE layers, so that a full color image can be obtained by additive color mixing after the light is conducted to the pupil of the observer. This also applies to the third working configuration described later.

Figure 10:
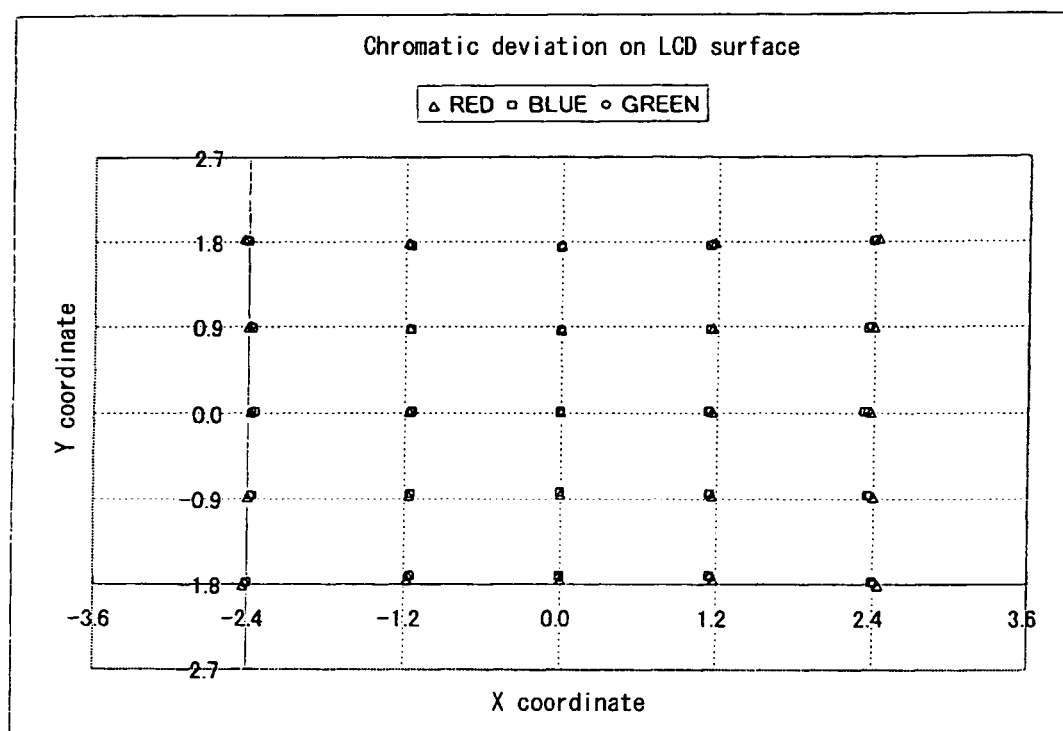
FIG. 10 is a diagram showing the RGB spot position deviation and distortion in a case where the first through third concrete examples of the second working configuration are multiplexed.

FIG. 10 shows the positional deviation of the R, G and B spots on the surface of the image forming element investigated and plotted for several points on the screen when ray tracing from the pupil of the eye of the user to the image forming element was performed for an image display device using a reflective type HOE in which the reflective type HOEs 6 of the first through third concrete examples of the present working configuration were multiplexed by one of the methods described above. The units of the X axis and Y axis are mm. The positional deviation of the spots is corrected to approximately 20 μm or less, so that a good color image can be obtained. Furthermore, since the size of the image forming element is 3.6×4.8 mm, the distortion of the optical system can also be evaluated by comparison with this scale. As is shown in FIG. 10, the distortion is favorably corrected for the optical systems of the respective concrete examples.

Figure 11:
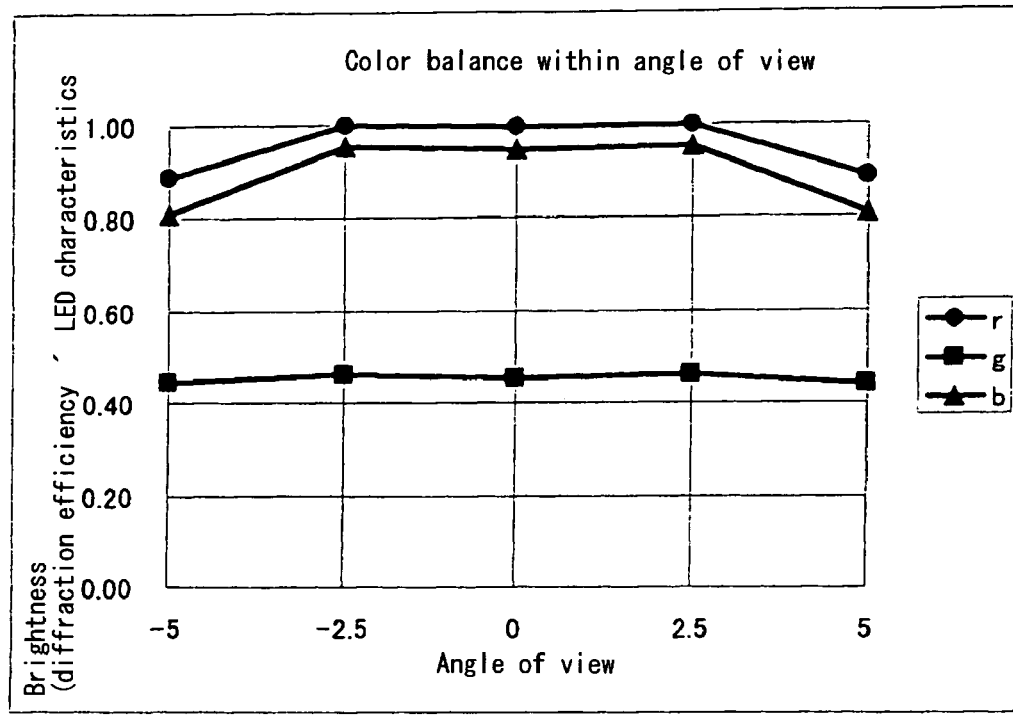
FIG. 11 is a diagram showing the variation in the brightness balance with respect to the variation in the angle of view, and the variation in the brightness balance with respect to the variation in the pupil coordinates, in a case where the first through third concrete examples of the second working configuration are multiplexed.
Figure 11:
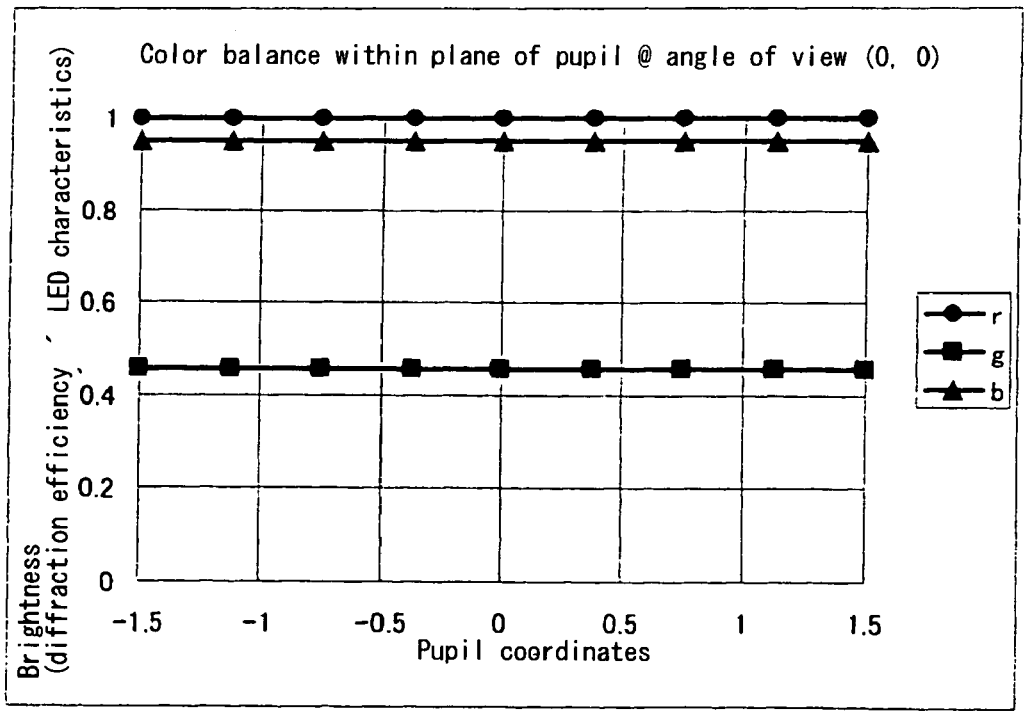

Moreover, FIG. 11 shows the brightness balance of the three colors with respect to the variation in the angle of view in the Y direction (a), and the brightness balance with respect to the variation in the Y coordinate of the pupil (b), when ray tracing from the pupil of the eye of the user to the image forming element was performed in a case where multiplexing was similarly performed. Here, the brightness is obtained by integrating the diffraction intensity of the reflected light reflected by the reflective type HOE 6 for the wavelength and aperture shape, and the brightness is normalized with the brightest point in both cases taken as 1. The slight peripheral attenuation of light seen in (a) is due to geometric optical vignetting. Since the wavelength shift in the dominant diffraction wavelength is extremely small, there is almost no attenuation of light due to the diffraction efficiency within either the screen or the plane of the pupil; it is thus seen that a good image display is obtained.

In addition, in all of the reflective type HOEs 6 of the first through third concrete examples of the present working configuration, the first light source and second light source are oriented in opposite directions in the normal direction of the HOE 6, and the first light source is at a distance of infinity. Furthermore, the phase coefficients are expressed as rotationally symmetrical coefficients. Accordingly, when the reflective type HOEs 6 of the first through third concrete examples are manufactured, the reference light is parallel light, and the exposure lens that produces the object light is constructed from a rotationally symmetrical aspherical lens or a plurality of spherical lenses that produce an equivalent wave front; the reference light and object light can be set coaxially in the normal direction of the HOE 6, thus offering the advantage of simplified axial alignment of the exposure optical system. The exposure lenses are respectively different for R, G and B, but the axes are coaxial; accordingly, the lenses can be successively exchanged using a structure such as a revolver or turret, or a construction in which simultaneous exposure is performed can also easily be set by mixing wave fronts of the three colors using an element such as a dichroic prism.

[Third Working Configuration]

Figure 12:
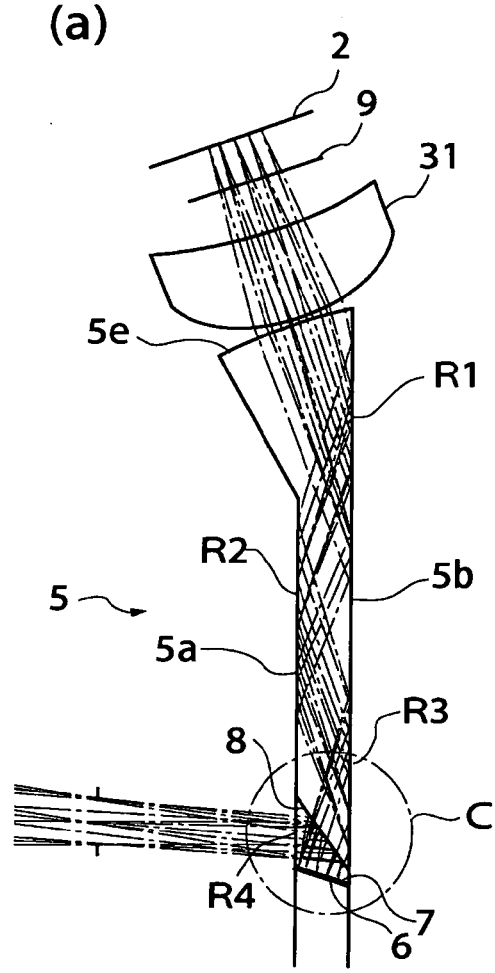
FIG. 12 is a diagram showing the construction of an image display device constituting a third working configuration of the present invention, and the path of the light rays in this image display device.
Figure 12:
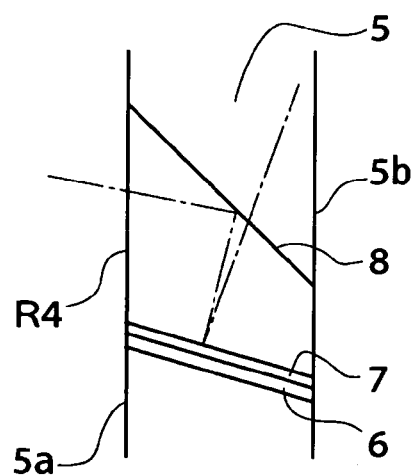

FIG. 12 is a diagram showing the construction of an image display device constituting a third working configuration of the present invention, and the path of the light rays (only the light rays from the image forming element 2) in this image display device. In FIG. 12, elements that are the same as elements in FIG. 1, or that correspond to elements in FIG. 1, are labeled with the same symbols, and a redundant description is omitted. Furthermore, the LED 3 and reflective mirror 4 that constitute the light source shown in FIG. 1 are omitted from FIG. 12. Furthermore, (a) is a schematic view illustrating the overall construction, and (b) is a partial enlarged view of part C.

The present working configuration basically differs from the first working configuration described above in that the λ/4 plate 7 and reflective type HOE 6 are disposed inside the plate-form part 5. Furthermore, the axis of the λ/2 plate 9 is disposed in a direction which is such that the linearly polarized light from the image forming element 2 is linearly polarized light that is polarized in the direction of the X axis. Specifically, since this light is incident on the PBS 8 as P polarized light, the light passes through the PBS 8, and is incident on the λ/4 plate 7, so that the light is converted into circularly polarized light; this light is then subjected to a reflection/diffraction effect and image focusing effect by the reflective type HOE 6. Subsequently, the light again passes through the λ/4 plate 7, and is converted into linearly polarized light with S polarization, after which the light is again incident on the PBS 8, and is reflected toward the eye of the user. Here, the axis of the λ/4 plate 7 is disposed in either the ±45° direction from a line on which the Y axis is projected as seen from the normal direction. Furthermore, in the present working configuration, a light conducting part 31 which is a spherical lens with a convex meniscus shape is used, a surface 5e is formed on the upper left part of the plate-form part, and this surface 5e has a spherical shape. Moreover, as in the second working configuration, a three-color LED is used as the LED 3 that constitutes the light source.

<First Concrete Example>

A first concrete example of the present working configuration will be described with reference to FIG. 12. The optical quantities of this concrete example are as follows: The diameter of the exit pupil P is 3 mm. Unlike the first and second working configurations described above, the visual field angle in the upward direction within the plane of the page in the figure is 0°, and the visual field angle in the downward direction within the plane of the page in the figure is −10°. The visual field angle in the direction of depth of the page is ±6.67°. The screen size in the plane of the page in the figure (i.e., the length between the point A1 and the point A2 in FIG. 1) is 3.6 mm. The screen size in the direction of depth of the page is 4.8 mm. The thickness d of the plate-form part 5 is 3.6 mm. The plate-form part 5 uses the same material as in the concrete example of the first working configuration described above. The various quantities used for ray tracing in this first concrete example are shown in Table 13 below. The order of the optical planes (order of the plane numbers) runs from the plane of the pupil of the eye of the user (=plane of the exit pupil P of the image combiner 1) to the image forming element 2.

TABLE 13

| Plane number (symbol) | Curvature radius | Medium nd | vd | |
|---|---|---|---|---|
| 1 (P) | INFINITY | 13 | | |
| 2 (5a:R4) | INFINITY | 1.593947 | 34.99 | |
| 3 (8) | INFINITY | 1.593947 | 34.99 | Reflective plane |
| 4 (6) | INFINITY | 1.593947 | 34.99 | Reflective plane |
| | Hologram plane: Definition of two light beams | | | |
| HV1: REA | | HV2: REA | | |
| HX1: 0.00E+00 | | HY1: 0.00E+00 | HZ1: −1.0000E+20 | |
| HX2: 0.00E+00 | | HY2: 0.00E+00 | HZ2: 5.9747E+01 | |
| 5 (5b:R3) | INFINITY | 1.593947 | 34.99 | Reflective plane |
| 6 (5a:R2) | INFINITY | 1.593947 | 34.99 | Reflective plane |
| 7 (5b:R1) | INFINITY | 1.593947 | 34.99 | Reflective plane |
| 8 (5e) | 49.6507 | | | |
| 9 (31a) | −10.0902 | 1.523362 | 66.83 | |
| 10 (31b) | −28.2838 | | | |
| 11 (2) | INFINITY | | | |

Furthermore, with regard to the positional relationship of the respective optical planes in the present concrete example, the absolute positions of the centers of the respective optical planes with the center of the first plane (plane No. 1=symbol P in FIG. 1) taken as the origin (X, Y, Z)=(0, 0, 0), and the amounts of rotation of these planes about the X axis (values measured with the counterclockwise rotation taken as the positive), are shown in Table 14 below.

TABLE 14

| Plane No. (symbol) | X coordinate value | Y coordinate value | Z coordinate value | Rotational angle about X axis [degree] |
|---|---|---|---|---|
| 1 (P) | 0 | 0 | 0 | 0 |
| 2 (5a:R4) | 0 | 0 | 13 | 0 |
| 3 (8) | 0 | 0 | 14.245 | 35 |
| 4 (6) | 0 | −3.47896 | 14.44718 | 72.1229 |
| 5 (5b:R3) | 0 | 0 | 16.6 | 0 |
| 6 (5a:R2) | 0 | 0 | 13 | 0 |
| 7 (5b:R1) | 0 | 0 | 16.6 | 0 |
| 8 (5e) | 0 | 34.21702 | 13.05283 | −71.1241 |
| 9 (31a) | 0 | 34.40626 | 12.98813 | −71.1241 |
| 10 (31b) | 0 | 40.5567 | 10.88525 | −71.1241 |
| 11 (2) | 0 | 47.02399 | 8.67404 | −71.1241 |

When the diffraction efficiency is calculated for the present concrete example, the dominant diffraction efficiency wavelengths of the principal rays at angles of view of −10°, −5° and 0°, and the dominant diffraction efficiency wavelengths of the principal rays at the end and center of the pupil coordinates at the respective angles of view, are as shown in Table 15 below.

TABLE 15

| | Angle of View | −10° | −5° | 0° |
|---|---|---|---|---|
| Pupil Coordinates | End | 530.3 | 531.8 | 531.5 |
| | Center | 530.7 | 531.9 | 531.6 |

Figure 13:
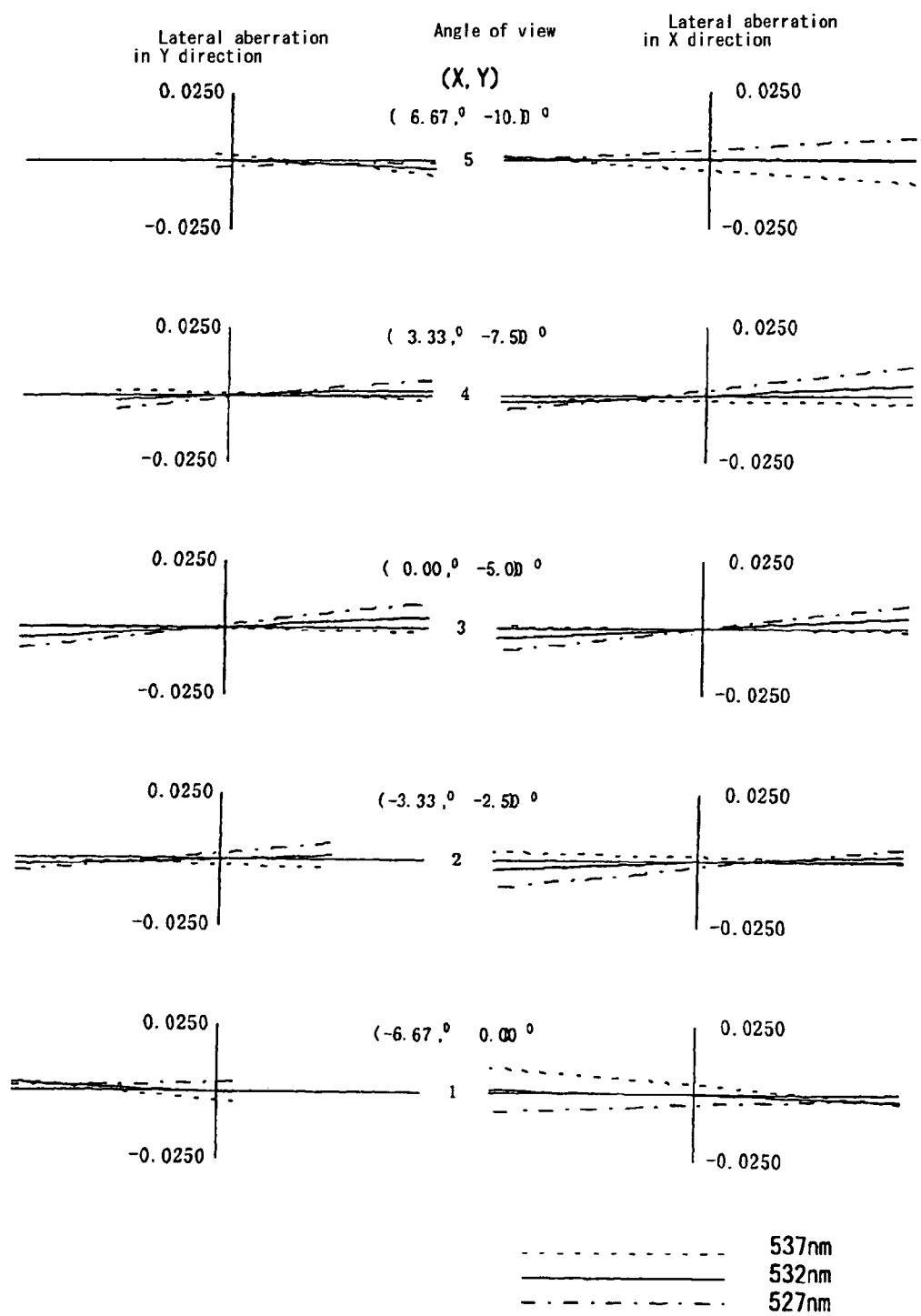
FIG. 13 is a diagram of lateral aberration in a first concrete example of the third working configuration.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 13. The lateral aberration of light rays with a dominant diffraction wavelength of ±5 nm is simultaneously shown for each angle of view in a single diagram. It is seen from FIG. 13 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 1°, and the angle of reflection/diffraction θ2 at the time of diffraction/reflection of these principal rays is 1°, so that the conditions described above are satisfied. As a result, as is seen from the content already described, there is no shift in the diffraction wavelength according to the angle of the line of sight, so that the image quality of the display image can be improved.

<Second Concrete Example>

Next, a second concrete example of the present working configuration will be described. The construction of this concrete example is completely the same as that of the first concrete example shown in FIG. 12; only the exposure wavelength and the definition of two light beams for the reflective type HOE 6 are different.

The various quantities of the reflective type HOE 6 in this concrete example are shown in Table 16 below.

TABLE 16

| Plane number (symbol) | Curvature radius | Medium nd | vd | |
|---|---|---|---|---|
| 4 (6) | INFINITY | 1.59347 | 34.99 | Reflective plane Hologram plane: Definition of two light beams |
| HV1: REA | | HV2: REA | | |
| HX1: 0.00E+00 | | HY1: 0.00E+00 | | HZ1: −1.0000E+20 |
| HX2: 0.00E+00 | | HY2: 0.00E+00 | | HZ2: 6.0618E+01 |

When the diffraction efficiency is calculated for the present concrete example, the dominant diffraction efficiency wavelengths of the principal rays at angles of view of −10°, −5° and 0°, and the dominant diffraction efficiency wavelengths of the principal rays at the end and center of the pupil coordinates at the respective angles of view, are as shown in Table 17 below.

TABLE 17

| | Angle of View | −10° | −5° | 0° |
|---|---|---|---|---|
| Pupil Coordinates | End | 475.0 | 476.3 | 476.2 |
| | Center | 475.3 | 476.3 | 476.2 |

Figure 14:
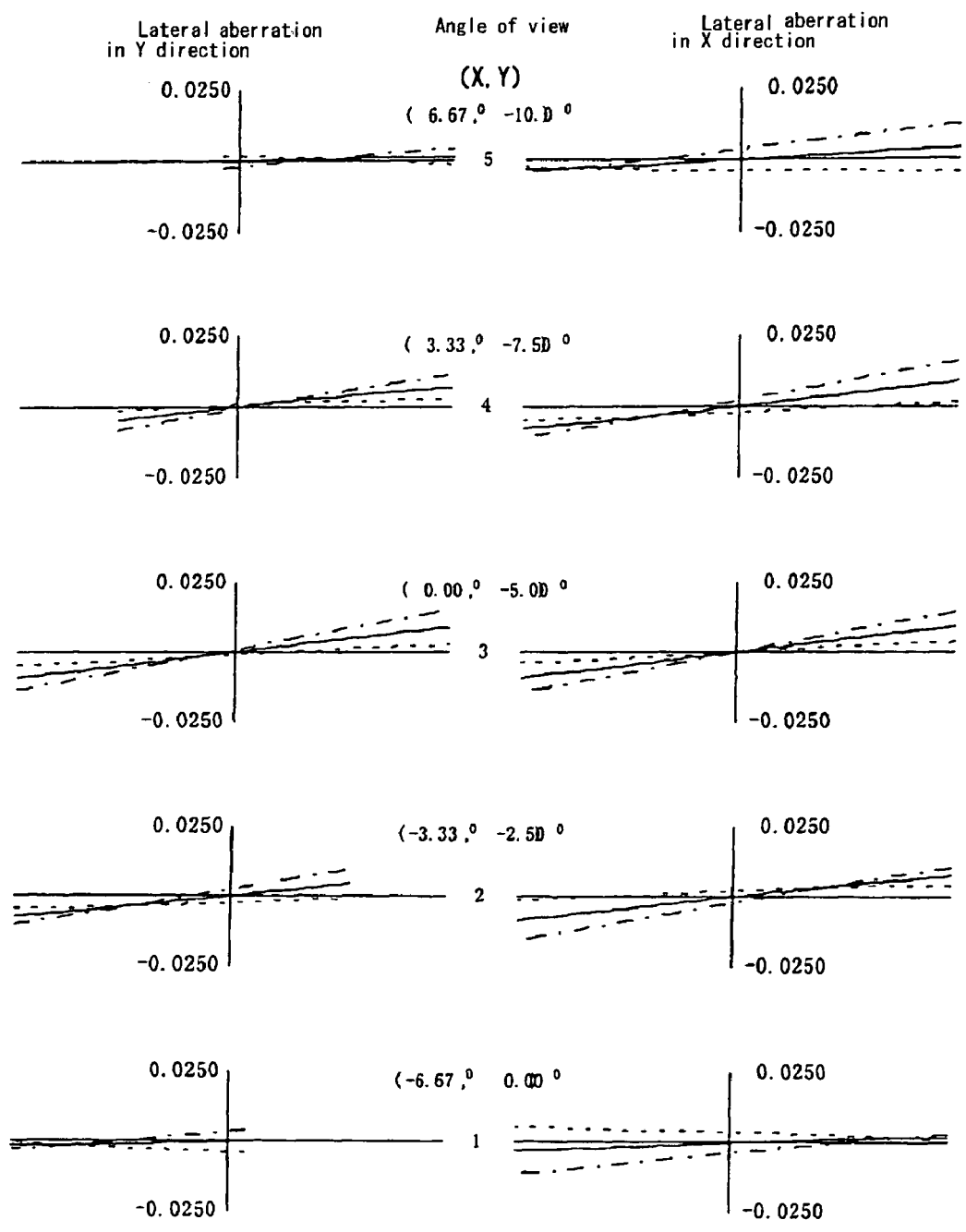
FIG. 14 is a diagram of lateral aberration in a second concrete example of the third working configuration.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 14. The lateral aberration of light rays with a dominant diffraction wavelength of +5 nm is simultaneously shown for each angle of view in a single diagram. It is seen from FIG. 14 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0.985°, and the angle of reflection/diffraction θ2 at the time of diffraction/reflection of these principal rays is 0.985°, so that the conditions described above are satisfied. As a result, as is seen from the content already described, there is no shift in the diffraction wavelength according to the angle of the line of sight, so that the image quality of the display image can be improved.

<Third Concrete Example>

Next, a third concrete example of the present working configuration will be described. The construction of this concrete example is completely the same as that of the first concrete example shown in FIG. 12; only the exposure wavelength and the definition of two light beams for the reflective type HOE 6 are different. The various quantities of the reflective type HOE 6 in this concrete example are shown in Table 18 below.

TABLE 18

| Plane number (symbol) | Curvature radius | Medium nd | vd | |
|---|---|---|---|---|
| 4 (6) | INFINITY | 1.59347 | 34.99 | Reflective plane Hologram plane: Definition of two light beams |
| HV1: REA | | HV2: REA | | |
| HX1: 0.00E+00 | | HY1: 0.00E+00 | | HZ1: −1.0000E+20 |
| HX2: 0.00E+00 | | HY2: 0.00E+00 | | HZ2: 5.8238E+01 |

When the diffraction efficiency is calculated for the present concrete example, the dominant diffraction efficiency wavelengths of the principal rays at angles of view of −10°, −5° and 0°, and the dominant diffraction efficiency wavelengths of the principal rays at the end and center of the pupil coordinates at the respective angles of view, are as shown in Table 19 below.

TABLE 19

| | Angle of View | −10° | −5° | 0° |
|---|---|---|---|---|
| Pupil Coordinates | End | 645 | 646.7 | 646.6 |
| | Center | 645.3 | 646.7 | 646.3 |

Figure 15:
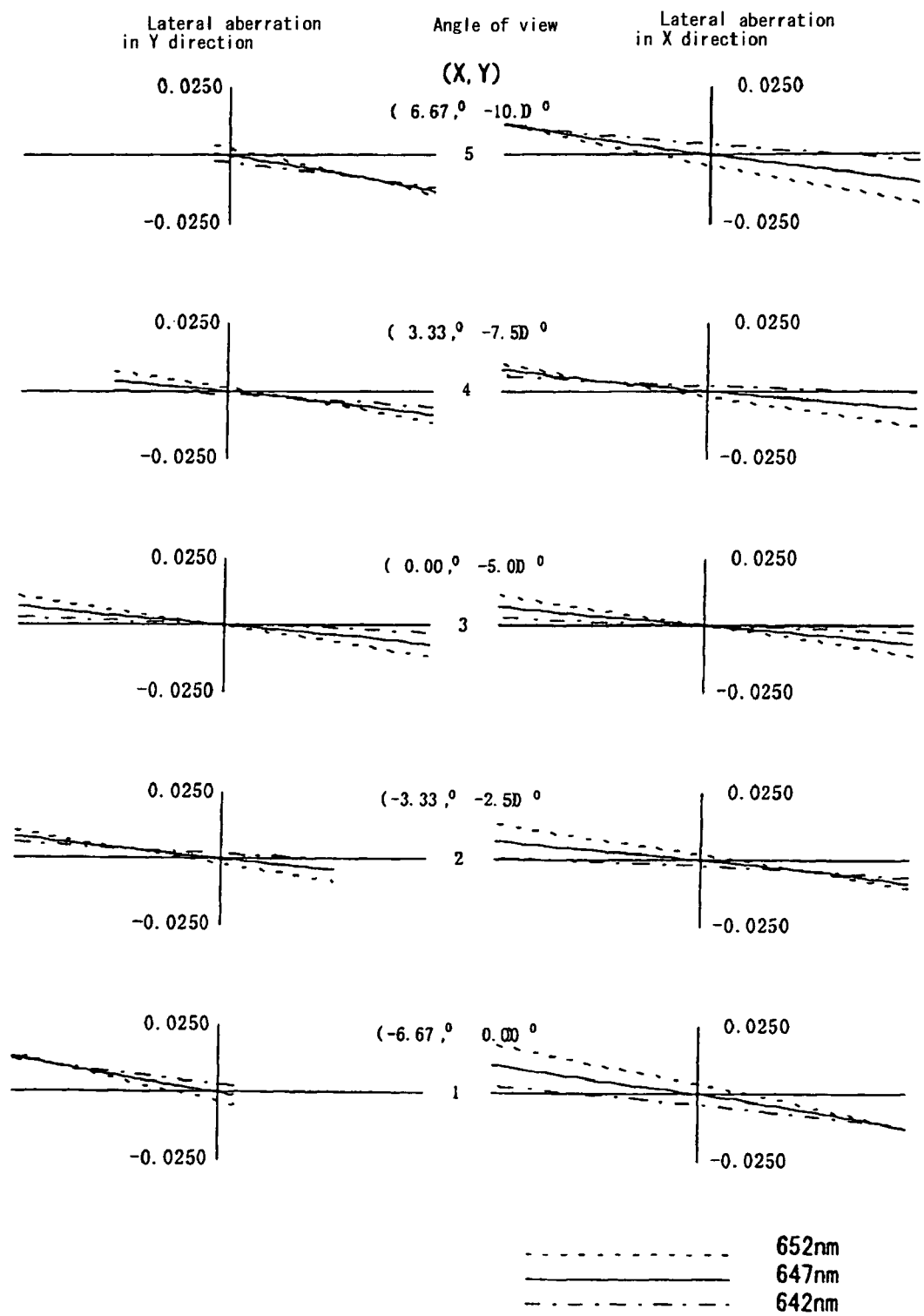
FIG. 15 is a diagram of lateral aberration in a third concrete example of the third working configuration.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 15. The lateral aberration of light rays with a dominant diffraction wavelength of ±5 nm is simultaneously shown for each angle of view in a single diagram. It is seen from FIG. 15 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 1.02°, and the angle of reflection/diffraction θ2 at the time of diffraction/reflection of these principal rays is 1.02°, so that the conditions described above are satisfied. As a result, as is seen from the content already described, there is no shift in the diffraction wavelength according to the angle of the line of sight, so that the image quality of the display image can be improved.

Figure 16:
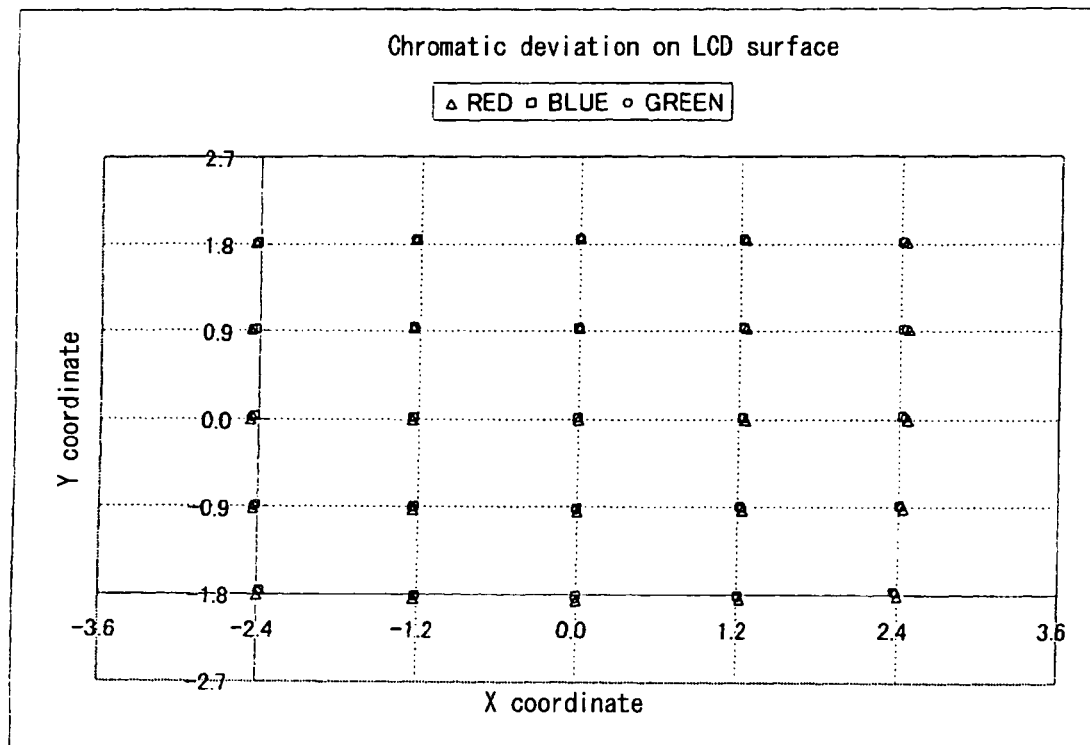
FIG. 16 is a diagram showing the RGB spot position deviation and distortion in a case where the first through third concrete examples of the third working configuration are multiplexed.

FIG. 16 shows the positional deviation of the R, G and B spots on the surface of the image forming element investigated and plotted for several points on the screen when ray tracing from the pupil of the eye of the user to the image forming element was performed in a case where the reflective type HOEs of the first through third concrete examples of the present working configuration were multiplexed to obtain a three-color HOE in the same manner as in the second working configuration described above. The units of the X axis and Y axis are mm. The positional deviation of the spots is corrected to approximately 29 μm or less, so that a good full color image can be obtained.

Figure 17:
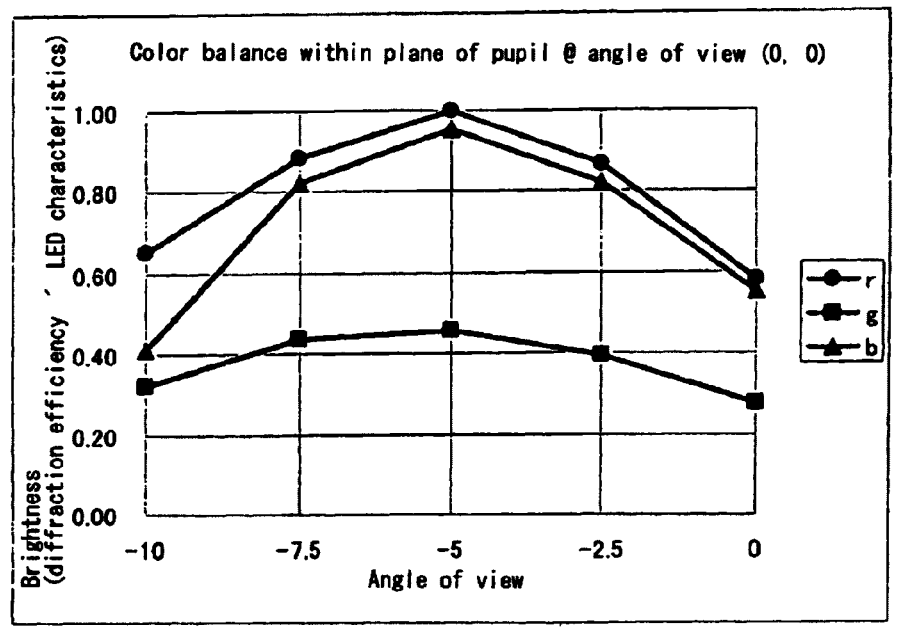
FIG. 17 is a diagram showing the variation in the brightness balance with respect to the variation in the angle of view, and the variation in the brightness balance with respect to the variation in the pupil coordinates, in a case where the first through third concrete examples of the third working configuration are multiplexed.
Figure 17:
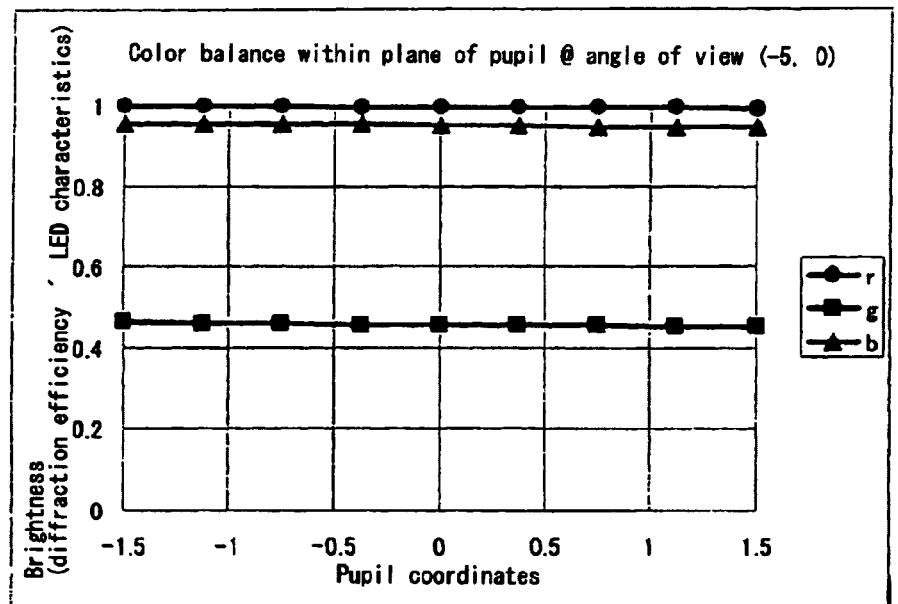

Furthermore, FIG. 17 shows the brightness balance of the three colors with respect to the variation in the angle of view in the Y direction (a), and the brightness balance with respect to the variation in the Y coordinate of the pupil (b), when ray tracing from the pupil of the eye of the user to the image forming element was performed in a case where multiplexing was similarly performed. Here, the brightness is obtained by integrating the diffraction intensity of the reflected light reflected by the reflective type HOE 6 for the wavelength and aperture shape. The peripheral attenuation of light seen in (a) is due to geometric optical vignetting.

Furthermore, in all of the reflective type HOEs 6 of the first through third concrete examples of the present working configuration, the first light source and the second light source are oriented in opposite directions in the normal direction of the reflective type HOE 6, and the first light source is at a distance of infinity. Furthermore, phase coefficients are not set. Accordingly, when the reflective type HOEs 6 of the first through third concrete examples are manufactured, the reference light and object light can be set coaxially in the normal direction of the reflective type HOE 6 using a simple construction in which the reference light is a planar wave and the object light is a spherical wave, so that the advantage of simplified axial alignment of the exposure optical system is obtained. The exposure lenses may be exchanged using microscope object lenses with respectively different focal distances, or spherical waves corresponding to R, G and B can be generated using a single type of exposure lens that generates an axial chromatic aberration. If wave fronts of three colors are mixed using a single type of exposure lens, then laser light of three colors can be synthesized beforehand on a single axis, and a construction in which simultaneous exposure is performed with the ratios of the respective amounts of light appropriately set can be set in a simple manner.

Moreover, in the respective working configurations described above, a PBS was used as a part of the image combiner; it would also be possible to give wavelength selectivity to the thin-film characteristics of this PBS. In this way, the see-through properties of the outside world light can be heightened. In this case, the peak wavelength and width at half maximum of the wavelength selectivity of the PBS film may be determined with consideration given to the incidence angle characteristics of the thin film. In cases where the variation in characteristics according to the angle of incidence can be ignored, it is desirable that the peak wavelength and width at half maximum of the wavelength selectivity of the HOE be substantially the same; however, it would also be possible to venture to use a setting that is narrower than the wavelength width of the wavelength selectivity of the HOE, and to utilize this in an effect that reduces the chromatic aberration of the light from the image display surface.

Conversely, it would also be possible to give priority to cost reduction, and to use an ordinary half-mirror. In this case, since the light beam from the image forming element passes through the half-mirror twice, the quantity of light is reduced to ¼ by the time that the light reaches the pupil of the eye of the user. Accordingly, it is necessary to increase the quantity of light of the LED that illuminates the image forming element.

[Fourth Working Configuration]

Figure 19:
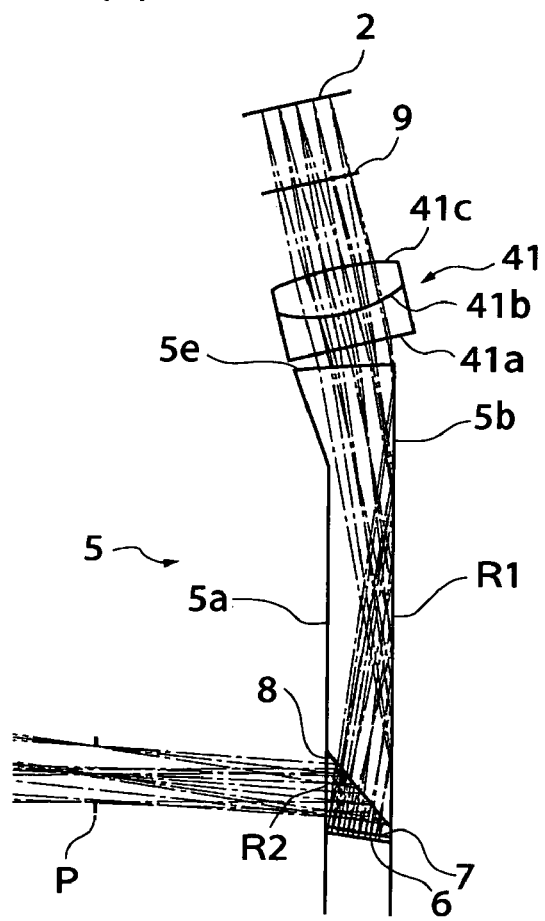
FIG. 19 is a diagram showing an image display device constituting a fourth working configuration of the present invention, and the path of the light rays in this image display device.
Figure 19:
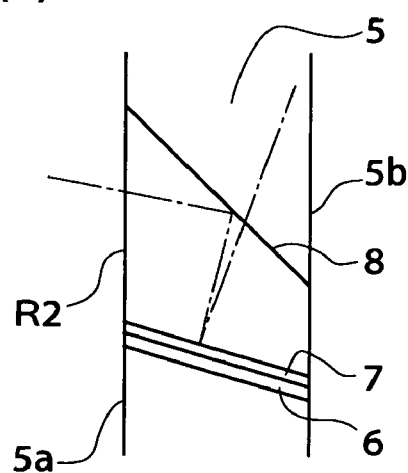

FIG. 19 is a diagram showing the construction of an image display device constituting a fourth working configuration of the present invention, and the path of the light rays (only the light rays from the image forming element 2) in this image display device. In FIG. 19, elements that are the same as elements in FIG. 1, or that correspond to elements in FIG. 1, are labeled with the same symbols, and a redundant description is omitted. Furthermore, the LED 3 and reflective mirror 4 that constitute the light source shown in FIG. 1 are omitted from FIG. 19.

The present working configuration basically differs from the third working configuration described above only in the angles of disposition of the PBS and HOE, and in that a cemented lens is used as the light conducting part 41. Specifically, a lens in which a convex lens and a concave lens are cemented are used in the light conducting part. 41a through 41c are symbols used to obtain a correspondence with the plane numbers.

<First Concrete Example>

A first concrete example of the present working configuration will be described with reference to FIG. 19. The optical quantities of this concrete example are as follows: The diameter of the exit pupil P is 3 mm. Unlike the first and second working configurations described above, the visual field angle in the upward direction within the plane of the page in the figure is 0°, and the visual field angle in the downward direction within the plane of the page in the figure is −90. The visual field angle in the direction of depth of the page is ±60. The screen size in the plane of the page in the figure (i.e., the length between the point A1 and the point A2 in FIG. 1) is 3.6 mm. The screen size in the direction of depth of the page is 4.8 mm. The thickness d of the plate-form part 5 is 3.6 mm. A material which is such that nd=1.583 and vd=29.9 is used for the plate-form part 5. The various quantities used for ray tracing in this first concrete example are shown in Table 20 below. The exposure wavelength of the HOE is 532 nm. The order of the optical planes (order of the plane numbers) runs from the plane of the pupil of the eye of the user (=plane of the exit pupil P of the image combiner 1) to the image forming element 2.

TABLE 20

| Plane number (symbol) | Curvature radius | Medium nd | vd | |
|---|---|---|---|---|
| 1 (P) | INFINITY | | | |
| 2 (5a:R2) | INFINITY | 1.583 | 29.9 | |
| 3 (8) | INFINITY | 1.583 | 29.9 | Reflective plane |
| 4 (6) | INFINITY | 1.583 | 29.9 | Reflective plane |
| | Hologram plane: Definition of two light beams | | | |

| HV1: | REA | HV2: | REA | | |
|---|---|---|---|---|---|
| HX1: | 0.00E+00 | HY1: | 0.00E+00 | HZ1: | −1.0000E+20 |

TABLE 20-continued

| Plane number (symbol) | Curvature radius | Medium nd | νd | | |
|---|---|---|---|---|---|
| HX2: 0.00E+00 | HY2: | 0.00E+00 | HZ2: | 0.359436E+02 | |
| 5 (5b:R1) | INFINITY | 1.583 | 29.9 | Reflective plane | |
| 6 (5e) | INFINITY | | | | |
| 7 (41a) | INFINITY | 1.59551 | 39.2 | | |
| 8 (41b) | −5.44919 | 1.54250 | 62.9 | | |
| 9 (41c) | 12.1127 | | | | |
| 10 (2) | INFINITY | | | | |

Furthermore, with regard to the positional relationship of the respective optical planes in the present concrete example, the absolute positions of the centers of the respective optical planes with the center of the first plane (plane No. 1=symbol P in FIG. 1) taken as the origin (X, Y, Z)=(0, 0, 0), and the amounts of rotation of these planes about the X axis (values measured with the counterclockwise rotation taken as the positive), are shown in Table 21 below.

TABLE 21

| Plane No. (symbol) | X coordinate value | Y coordinate value | Z coordinate value | Rotational angle about X axis [degree] |
|---|---|---|---|---|
| 1 (P) | 0 | 0 | 0 | 0 |
| 2 (5a:R2) | 0 | 0 | 13 | 0 |
| 3 (8) | 0 | 0 | 14 | 39 |
| 4 (6) | 0 | −3.38598 | 14.53864 | 80.841 |
| 5 (5b:R1) | 0 | 0 | 16.6 | 0 |
| 6 (5e) | 0 | 22.90849 | 14.47439 | −87.1364 |
| 7 (41a) | 0 | 23.8958 | 14.1956 | −77.1401 |
| 8 (41b) | 0 | 25.35817 | 13.86174 | −77.1401 |
| 9 (41c) | 0 | 28.28293 | 13.19404 | −77.1401 |
| 10 (2) | 0 | 37.49641 | 11.09066 | −77.1401 |

When the diffraction efficiency is calculated for the present concrete example, the dominant diffraction efficiency wavelengths of the principal rays at angles of view of −9°, −4.5° and 0°, and the dominant diffraction efficiency wavelengths of the principal rays at the end and center of the pupil coordinates at the respective angles of view, are as shown in Table 22 below.

TABLE 22

| | Angle of View | −9° | −4.5° | 0° |
|---|---|---|---|---|
| Pupil Coordinates | End | 531.1 | 531.9 | 531.1 |
| | Center | 531.5 | 531.9 | 531.5 |

Figure 20:
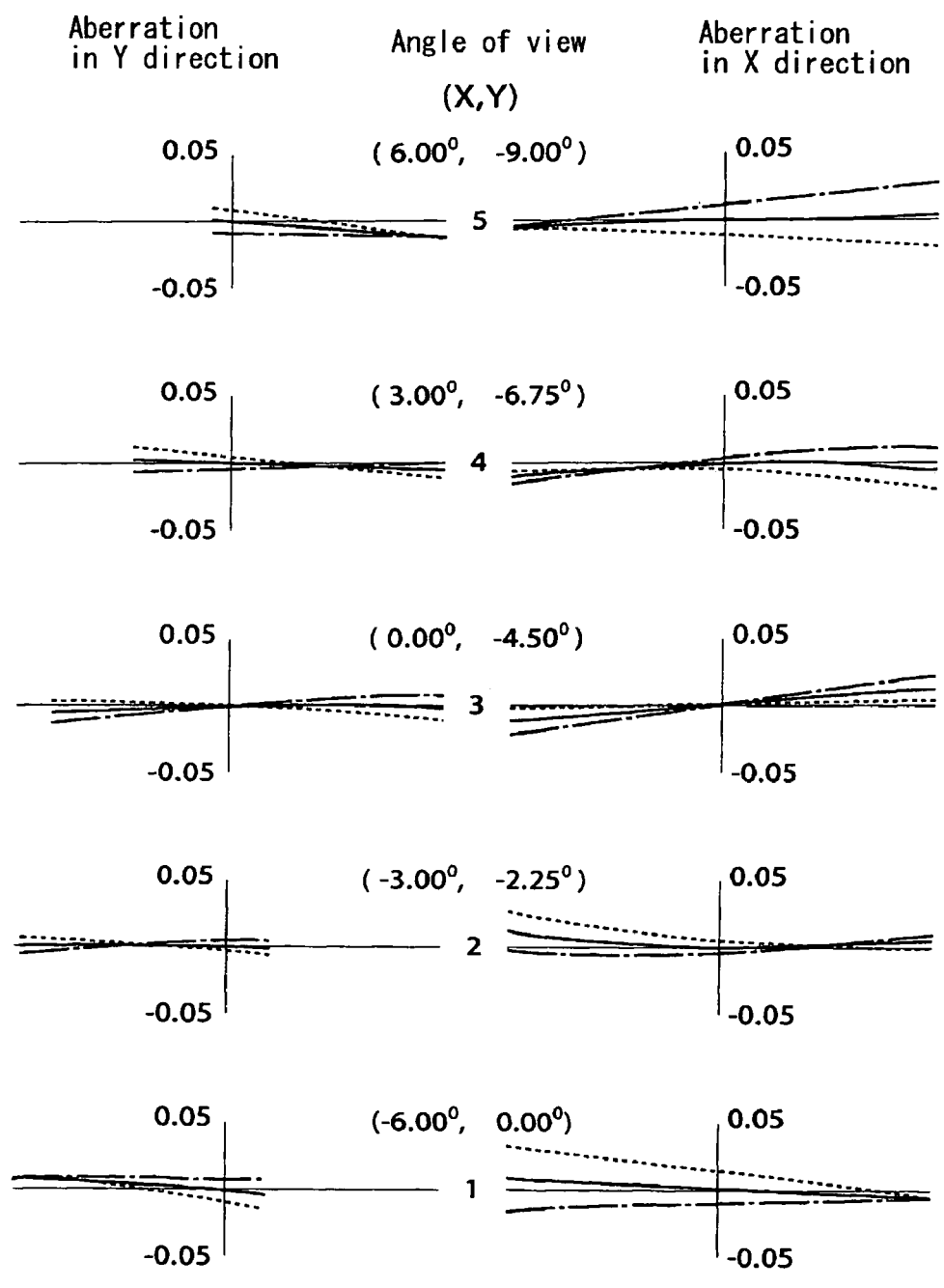
FIG. 20 is a diagram of lateral aberration at three wavelengths representing green in an image display device constituting a fourth working configuration of the present invention.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 20. The lateral aberration of light rays with a dominant diffraction wavelength of ±5 nm is simultaneously shown for each angle of view in a single diagram. It is seen from FIG. 20 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0.01°, and the angle of reflection/diffraction θ2 at the time of diffraction/reflection of these principal rays is 0.01°, so that the conditions described above are satisfied. As a result, as is seen from the content already described, there is no shift in the diffraction wavelength according to the angle of the line of sight, so that the image quality of the display image can be improved.

<Second Concrete Example>

Except only for the exposure wavelength of the HOE being 476.5 nm, the other conditions of the second concrete example are the same as those of the first concrete example. When the diffraction efficiency is calculated for the present concrete example, the dominant diffraction efficiency wavelengths of the principal rays at angles of view of −9°, −4.5° and 0°, and the dominant diffraction efficiency wavelengths of the principal rays at the end and center of the pupil coordinates at the respective angles of view, are as shown in Table 23 below.

TABLE 23

| | Angle of View | −9° | −4.5° | 0° |
|---|---|---|---|---|
| Pupil Coordinates | End | 475.7 | 476.4 | 475.7 |
| | Center | 476.1 | 476.4 | 476.1 |

Figure 21:
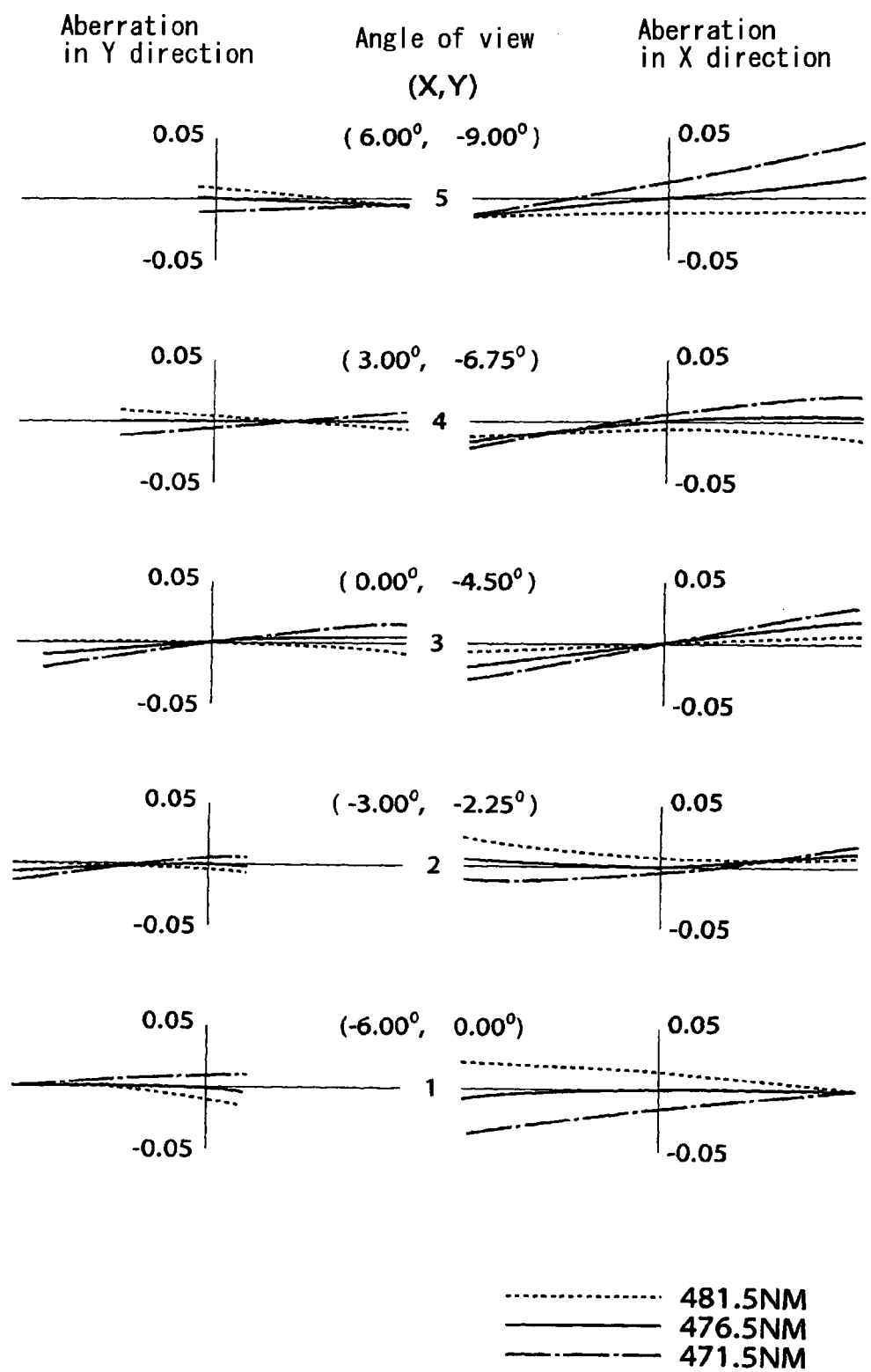
FIG. 21 is a diagram of lateral aberration at three wavelengths representing blue in an image display device constituting a fourth working configuration of the present invention.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 21. The lateral aberration of light rays with a dominant diffraction wavelength of ±5 nm is simultaneously shown for each angle of view in a single diagram. It is seen from FIG. 21 that there is little chromatic aberration over the entire region within the angle of view, so that the image focusing performance is superior.

In the present concrete example, the angle of incidence θ1 at which the principal rays emitted from the center of the display part of the image display means are incident on the reflective type holographic optical element is 0.03°, and the angle of reflection/diffraction θ2 at the time of diffraction/reflection of these principal rays is 0.03°, so that the conditions described above are satisfied. As a result, as is seen from the content already described, there is no shift in the diffraction wavelength according to the angle of the line of sight, so that the image quality of the display image can be improved.

<Third Concrete Example>

Except only for the exposure wavelength of the HOE being 647 nm, the other conditions of the third concrete example are the same as those of the first concrete example. When the diffraction efficiency is calculated for the present concrete example, the dominant diffraction efficiency wavelengths of the principal rays at angles of view of −9°, −4.5° and 0°, and the dominant diffraction efficiency wavelengths of the principal rays at the end and center of the pupil coordinates at the respective angles of view, are as shown in Table 24 below.

TABLE 24

| | Angle of View | −9.5° | −4.5° | 0° |
|---|---|---|---|---|
| Pupil Coordinates | End | 645.9 | 646.9 | 645.9 |
| | Center | 646.3 | 646.9 | 646.4 |

Figure 22:
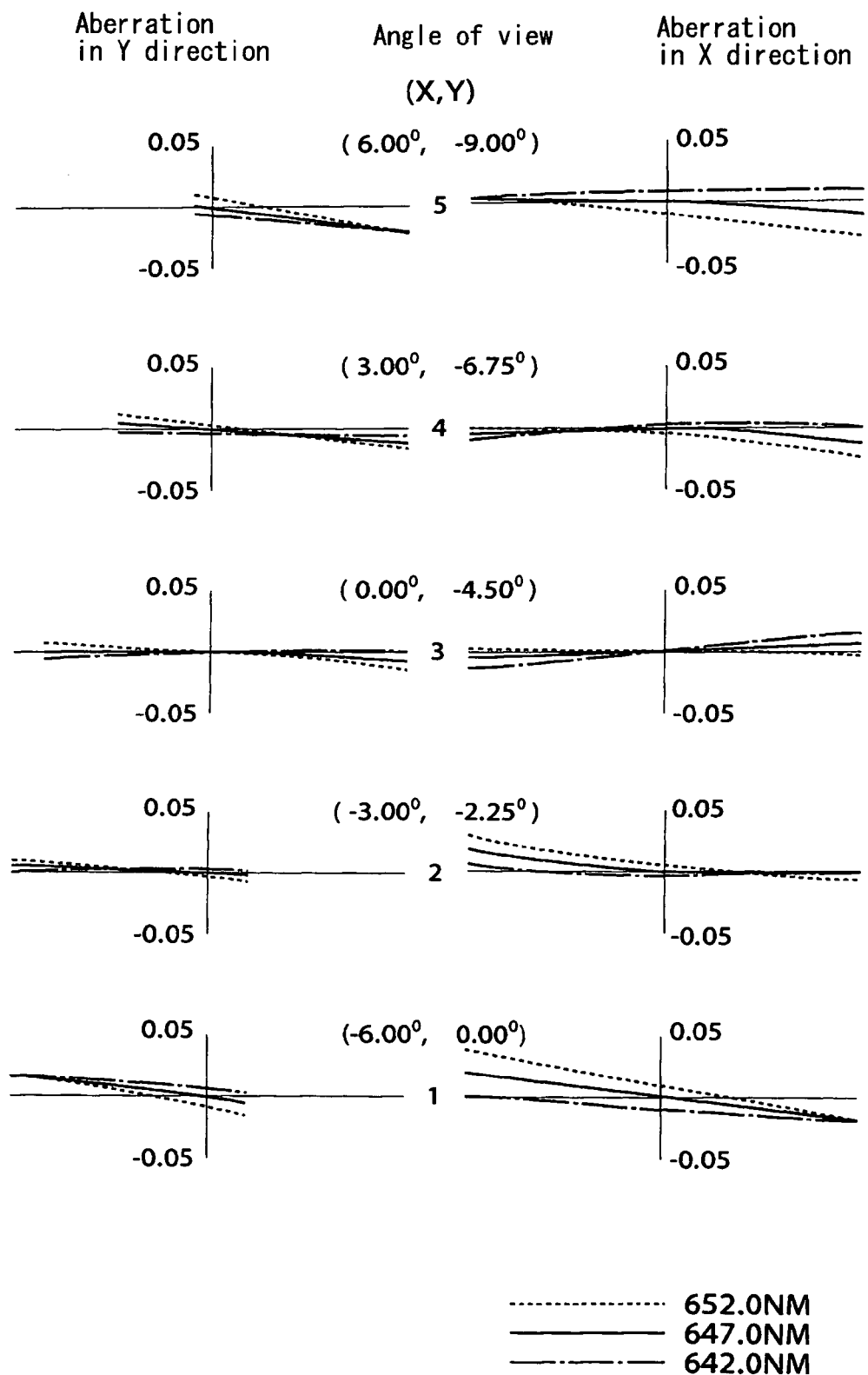
FIG. 22 is a diagram of lateral aberration at three wavelengths representing red in an image display device constituting a fourth working configuration of the present invention.

It is seen that the dominant diffraction efficiency wavelength shows almost no fluctuation with either variation in the angle of view or variation in the pupil coordinates. Furthermore, a lateral aberration diagram which is used to show the image focusing performance of the optical system in the present concrete example is shown in FIG. 22. The lateral aberration of light rays with a dominant diffraction wavelength of ±5 nm is simultaneously shown for each angle of view in a single diagram. It is seen from FIG. 22 that there is little chromatic aberration over the entire region within the angle of view, so that the image focusing performance is superior. The angle of incidence θ1 is 0.01°, and the angle of reflection/diffraction θ2 is 0.01°.

Figure 23:
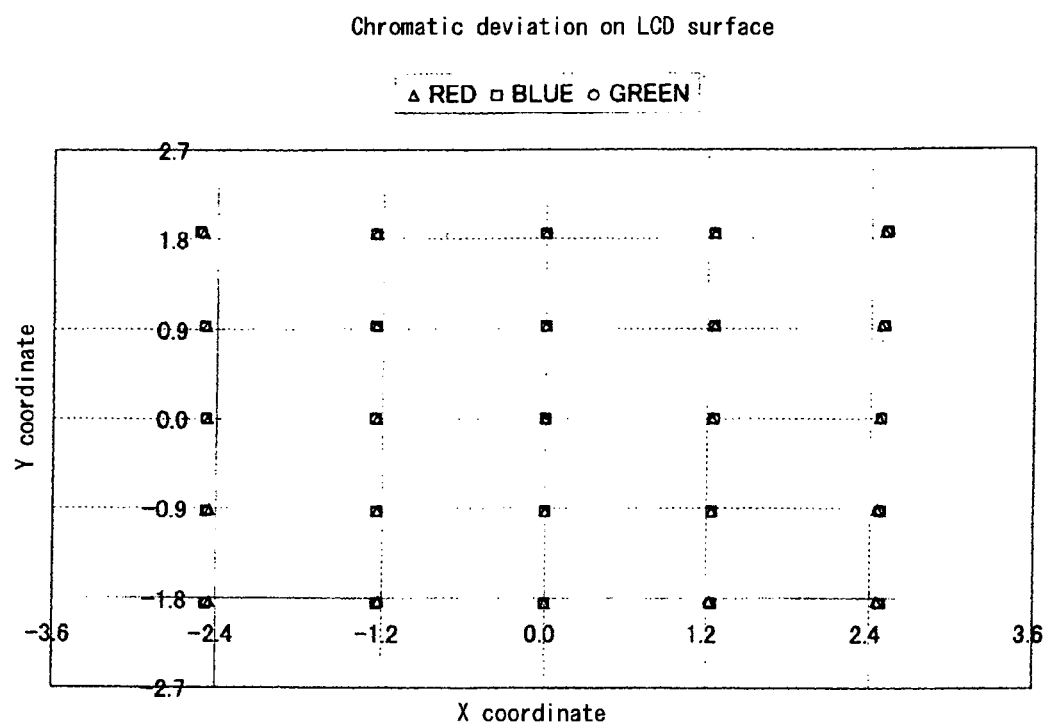
FIG. 23 is a diagram showing the RGB spot position deviation and distortion in a case where multiplexing is performed in an image display device constituting a fourth working configuration of the present invention.

FIG. 23 shows the positional deviation of the R, G and B spots on the surface of the image forming element investigated and plotted for several points on the screen when ray tracing from the pupil of the eye of the user to the image forming element was performed in a case where the reflective type HOEs of the first through third concrete examples of the present working configuration were multiplexed to obtain a three-color HOE in the same manner as in the second working configuration described above. The positional deviation of the spots is corrected to approximately 10 μm or less, so that a good full color image can be obtained.

Figure 24:
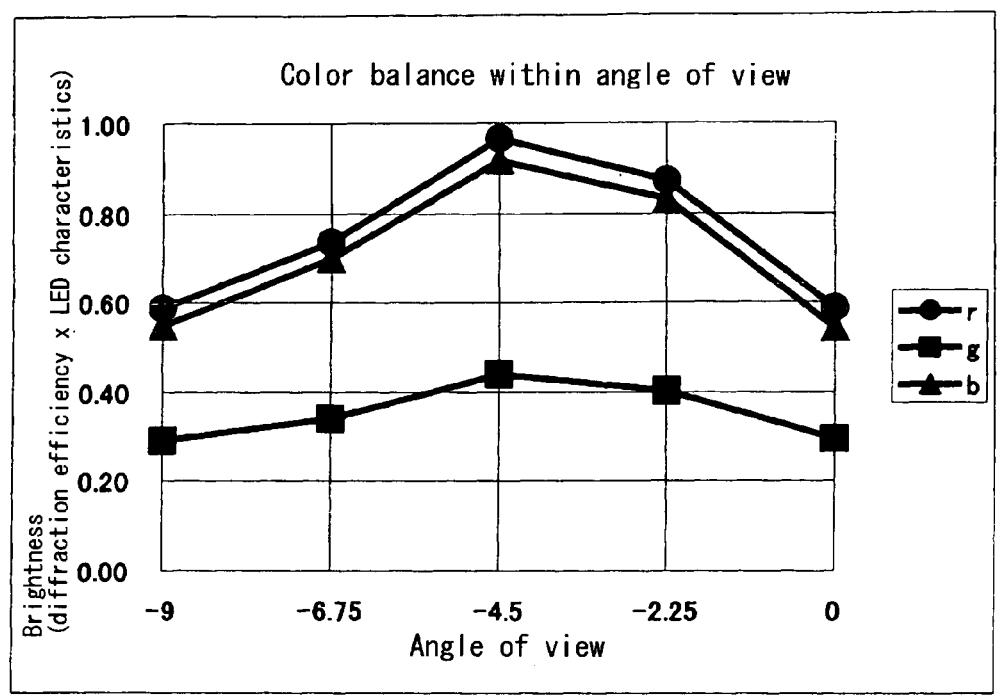
FIG. 24 is a diagram showing the variation in the brightness balance with respect to the variation in the angle of view and the variation in the pupil coordinates in a case where multiplexing is performed in an image display device constituting a fourth working configuration of the present invention.
Figure 24:
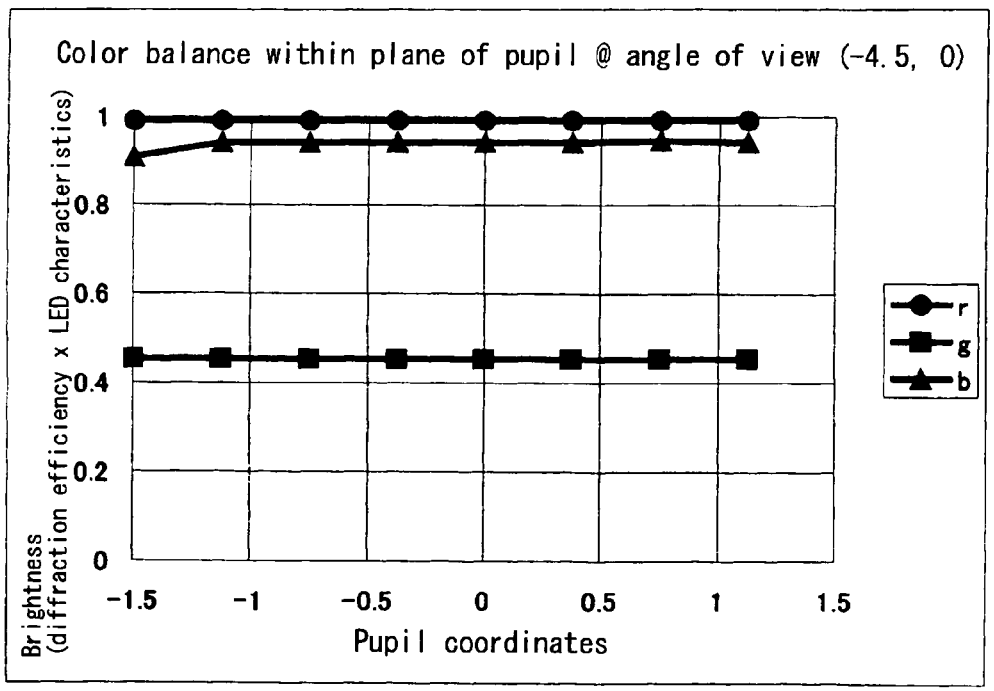

Furthermore, FIG. 24 shows the brightness balance of the three colors with respect to the variation in the angle of view in the Y direction (a), and the brightness balance with respect to the variation in the Y coordinate of the pupil (b), when ray tracing from the pupil of the eye of the user to the image forming element was performed in a case where multiplexing was similarly performed.

Here, the brightness and the diffraction efficiency are both normalized with the brightest point taken as 1. The peripheral attenuation of light seen in (a) is due to geometric optical vignetting.

A matter that is to be especially noted in the present working configuration is that since the coordinates of the second light source are the same for RGB, multiple exposure can be simultaneously achieved using a simple spherical wave generating means during multiple exposure. Furthermore, since the angle of incidence on the PBS is 42°, a PBS film with a high extinction ratio can be set.

Respective working configurations of the present invention, and concrete examples of these working configurations, were described above. However, the present invention is not limited to these working configurations or concrete examples. For instance, the respective working configurations described above were examples in which a head mounted image display device was constructed using the image combiner of the present invention. However, the respective image combiners 1 used in the respective working configurations described above could also be constructed so as to allow mounting on the ocular lens parts of camera view finders, microscopes and binoculars, or these image combiners could also be incorporated into cameras, microscopes, binoculars, or the like.

The working configurations of the present invention described above make it possible to suppress the wavelength shift phenomenon in the diffraction efficiency with respect to variation in the angle of the line of sight. Accordingly, it is possible to obtain a bright observed image that shows no loss in the quantity of light up to the periphery of the screen and the periphery of the pupil. Furthermore, since the reference light and object light during exposure can be set on one axis in the normal direction of the HOE plane, the disposition and adjustment of the exposure optical system are extremely simple. Moreover, since the construction used is a construction in which the surface that has an optical power is not eccentric at all with respect to the optical axis, a major special feature of the present invention is that no eccentric aberration is generated; as a result, a high-resolution optical system can be realized using a simple construction.

The invention claimed is:

1. An image combiner in which a reflective type holographic optical element is installed, and light from an image forming means and light passing through the main body are superimposed, wherein the light that is emitted from the image forming means has only a single wavelength region component or a plurality of discrete wavelength region components, and the following conditions are established between the angle of incidence at which the principal rays emitted from the center of display part of the image forming means are incident on the surface of the reflective type holographic optical element and the angle of reflection/diffraction:

$-5<\theta1<5$, and $|\theta1-\theta2|<3$;

θ1: the angle of incidence (°) at which the principal rays emitted from the center of the display part of the image forming means are incident on the reflective type holographic optical element; and θ2: the reflection/diffraction angle (°) when the principal rays emitted from the center of the display part are diffracted/reflected by the reflective type holographic optical element.

2. The image combiner according to claim 1, wherein $-3<\theta1<3$.

3. The image combiner according to claim 1, wherein $|\theta1-\theta2|<2$.

4. The image combiner according to claim 1, wherein the reflective type holographic optical element is a volume type element.

5. The image combiner according to claim 1, wherein the reflective type holographic optical element has an optical power.

6. The image combiner according to claim 1, wherein the direction of emission of the principal rays from the image forming means is a direction that is substantially perpendicular to the surface of the display part of the image forming means.

7. An image display device comprising the image combiner and the image forming means according to claim 1, wherein at least the part containing the image combiner is used in close proximity to one or both of eyes of the user during use.

8. An image display device in which a reflective type holographic optical element is installed, and light from an image forming means is displayed, wherein the light that is emitted from the image forming means has only a single wavelength region component or a plurality of discrete wavelength region components, and the following conditions are established between the angle of incidence at which the principal rays emitted from a center of the display part of the image forming means are incident on the surface of the reflective type holographic optical element and the angle of reflection/diffraction:

$-5<\theta1<5$, and $|\theta1-\theta2|<3$;

θ1: angle of incidence (°) at which the principal rays emitted from the center of the display part of the image forming means are incident on the reflective type holographic optical elements; and θ2: reflection/diffraction angle (°) when the principal rays emitted from the center of the display part are diffracted/reflected by the reflective type holographic optical element.

9. The image display device according to claim 8, wherein $-3<\theta1<3$.

10. The image display device according to claim 8, wherein $|\theta1-\theta2|<2$.

11. The image display device according to claim 8, wherein the reflective type holographic optical element is a volume type element.

12. The image display device according to claim 8, wherein the reflective type holographic optical element has an optical power.

13. The image display device according to claim 8, wherein the direction of emission of the principal rays from the image forming means is a direction that is substantially perpendicular to the surface of the display part of the image forming means.

14. An image display device which has an image combiner in which images formed by illuminating a reflective type holographic optical element with light from an image forming element are superimposed on light from the outside world so that double images are formed, wherein this image display device has a polarizing beam splitter disposed inside a light transmitting body and a ¼ wavelength plate disposed on the side of the outside world as seen from this polarizing beam splitter, the reflective type holographic optical element is disposed on the outside world side of the ¼ wavelength plate, and is constructed in such a manner that the light from the image forming element is incident on the light transmitting body in a polarized state so that this light is reflected by the polarizing beam splitter, this light is incident on the polarizing beam splitter while being totally reflected by both surfaces of the light transmitting body, the light is reflected by the polarizing beam splitter and passes through the ¼ wavelength plate, the light is then incident on the reflective type holographic optical element at an angle of incidence of $\theta1$ (°), and is diffracted/reflected at a reflection angle of $\theta2$ (°), the light again passes through the ¼ wavelength plate, and the light then passes through the polarizing beam splitter, and reaches the eye of the user together with light from the outside world that has passed through the light transmitting body, and there is a relationship of $|\theta1-\theta2|<3$ between the angle of incidence $\theta1$ and reflection angle $\theta2$.

15. An image display device which has an image combiner in which images formed by illuminating a reflective type holographic optical element with light from an image forming element are superimposed on light from the outside world so that double images are formed, wherein this image display device has a polarizing beam splitter disposed inside a light transmitting body and a ¼ wavelength plate disposed on the side of the outside world as seen from this polarizing beam splitter, in a position with an air gap interposed between the ¼ wavelength plate and the light transmitting body, the reflective type holographic optical element is disposed on the outside world side of the ¼ wavelength plate, and is constructed in such a manner that the light from the image forming element is incident on the light transmitting body in a polarized state so that this light is reflected by the polarizing beam splitter, this light is incident on the polarizing beam splitter while being totally reflected by both surfaces of the light transmitting body, the light is reflected by the polarizing beam splitter and passes through the ¼ wavelength plate, the light is then incident on the reflective type holographic optical element at an angle of incidence of $\theta1$ (°), and is diffracted/reflected at a reflection angle of $\theta2$ (°), the light again passes through the ¼ wavelength plate, and the light then passes through the polarizing beam splitter, and reaches the eye of the user together with light from the outside world that has passed through the light transmitting body, and there is a relationship of $|\theta1-\theta2|<3$ between the angle of incidence $\theta1$ and reflection angle $\theta2$.

16. An image display device which has an image combiner in which images formed by illuminating a reflective type holographic optical element with light from an image forming element are superimposed on light from the outside world so that double images are formed, wherein this image display device has a polarizing beam splitter disposed inside a light transmitting body and a ¼ wavelength plate disposed inside this light transmitting body on the opposite side of this polarizing beam splitter from the image forming element, the reflective type holographic optical element is disposed on the opposite side of the ¼ wavelength plate from the polarizing beam splitter, and is constructed in such a manner that the light from the image forming element is incident on the light transmitting body in a polarized state so that this light passes through the polarizing beam splitter, this light is incident on the polarizing beam splitter while being totally reflected by both surfaces of the light transmitting body, the light passes through the polarizing beam splitter and passes through the ¼ wavelength plate, the light is then incident on the reflective type holographic optical element at an angle of incidence of $\theta1$ (°), and is diffracted/reflected at a reflection angle of $\theta2$ (°), the light again passes through the ¼ wavelength plate, and the light is then reflected by the polarizing beam splitter, and reaches the eye of the user together with light from the outside world that has passed through the light transmitting body, and there is a relationship of $|\theta1-\theta2|<3$ between the angle of incidence $\theta1$ and reflection angle $\theta2$.

17. An image display device which has an image combiner in which images formed by illuminating a reflective type holographic optical element with light from an image forming element are superimposed on light from the outside world so that double images are formed, wherein this image display device has a half-mirror disposed inside a light transmitting body, the reflective type holographic optical element is disposed on the surface of the light transmitting body that faces the outside world, and is constructed in such a manner that the light from the image forming element is incident on the light transmitting body, and is then incident on the half-mirror while being totally reflected by both surfaces of the light transmitting body, this light is reflected by the half-mirror, the light is incident on the reflective type holographic optical element at an angle of incidence of $\theta1$ (°), and is diffracted/reflected at a reflection angle of $\theta2$ (°), and the light passes through the half-mirror, and reaches the eye of the user together with light from the outside world that has passed through the light transmitting body, and there is a relationship of $|\theta1-\theta2|<3$ between the angle of incidence $\theta1$ and reflection angle $\theta2$.

18. An image display device which has an image combiner in which images formed by illuminating a reflective type holographic optical element with light from an image forming element are superimposed on light from the outside world so that double images are formed, wherein this image display device has a half-mirror disposed inside a light transmitting body, the reflective type holographic optical element is disposed in a position with an air gap interposed between this holographic optical element and the light transmitting body, and is constructed in such a manner that the light from the image forming element is incident on the light transmitting body, and is then incident on the half-mirror while being totally reflected by both surfaces of the light transmitting body, this light is reflected by the half-mirror, the light is incident on the reflective type holographic optical element at an angle of incidence of $\theta1$ (°), and is diffracted/reflected at a reflection angle of θ2 (°), and the light passes through the half-mirror, and reaches the eye of the user together with light from the outside world that has passed through the light transmitting body, and there is a relationship of |θ1−θ2|<3 between the angle of incidence θ1 and reflection angle θ2.

19. An image display device which has an image combiner in which images formed by illuminating a reflective type holographic optical element with light from an image forming element are superimposed on light from the outside world so that double images are formed, wherein this image display device has a half-mirror disposed inside a light transmitting body, the reflective type holographic optical element is disposed inside the light transmitting body on the opposite side of the half-mirror from the image forming element, and is constructed in such a manner that the light from the image forming element is incident on the light transmitting body, and is then incident on the half-mirror while being totally reflected by both surfaces of the light transmitting body, this light passes through the half-mirror, the light is incident on the reflective type holographic optical element at an angle of incidence of θ1 (°), and is diffracted/reflected at a reflection angle of θ2 (°), and the light is reflected by the half-mirror, and reaches the eye of the user together with light from the outside world that has passed through the light transmitting body, and there is a relationship of |θ1−θ2|<3 between the angle of incidence θ1 and reflection angle θ2.

20. An image display device comprising the image combiner and the image forming means according to claim 2, wherein at least the part containing the image combiner is used in close proximity to one or both of eyes of the user during use.

21. An image display device comprising the image combiner and the image forming means according to claim 3, wherein at least the part containing the image combiner is used in close proximity to one or both of eyes of the user during use.

22. An image display device comprising the image combiner and the image forming means according to claim 4, wherein at least the part containing the image combiner is used in close proximity to one or both of eyes of the user during use.

23. An image display device comprising the image combiner and the image forming means according to claim 5, wherein at least the part containing the image combiner is used in close proximity to one or both of eyes of the user during use.

24. An image display device comprising the image combiner and the image forming means according to claim 6, wherein at least the part containing the image combiner is used in close proximity to one or both of eyes of the user during use.

* * * * *